(12) United States Patent
Kawahara et al.

(10) Patent No.: US 8,531,951 B2
(45) Date of Patent: Sep. 10, 2013

(54) NETWORK SYSTEM, MANAGEMENT COMPUTER, AND BANDWIDTH MANAGEMENT METHOD

(75) Inventors: Kota Kawahara, Kawasaki (JP); Kenji Kataoka, Yokohama (JP); Yasumichi Nonaka, Yokohama (JP); Hitoshi Ihara, Chigasaki (JP); Koji Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 112 days.

(21) Appl. No.: 13/302,467

(22) Filed: Nov. 22, 2011

(65) Prior Publication Data
US 2012/0140775 A1    Jun. 7, 2012

(30) Foreign Application Priority Data

Nov. 22, 2010   (JP) ................................. 2010-259833

(51) Int. Cl.
*G01R 31/08*    (2006.01)
(52) U.S. Cl.
USPC ........ 370/232; 370/231; 370/238; 370/395.2; 370/395.41
(58) Field of Classification Search
USPC ................. 370/231, 232, 238, 395.2, 395.41
See application file for complete search history.

(56) References Cited

U.S. PATENT DOCUMENTS

2007/0121503 A1*  5/2007  Guo et al. .................... 370/230
2008/0175269 A1*  7/2008  Alvarez et al. ............... 370/468

FOREIGN PATENT DOCUMENTS

JP     2001-244974    9/2001
JP     2008-301225    12/2008

* cited by examiner

*Primary Examiner* — Chandrahas Patel
*Assistant Examiner* — Kabir Jahangir
(74) *Attorney, Agent, or Firm* — McDermott Will & Emery LLP

(57) ABSTRACT

In a packet transport network, to determine a path route in which a bottleneck does not occur with a small amount of calculation, provided is a network system, including data transfer devices and a management computer, each of the data transfer devices including IFs, in which the management computer is configured to: store remaining bandwidth information on the each of the IFs; select one of bandwidths; judge, based on the remaining bandwidth information and the selected bandwidth, whether or not the each of the IFs is usable; determine a route candidate though which data is transferred, bypassing the each of the IFs which has been judged to be unusable; judge, based on the remaining bandwidth information, whether or not continuity of the IF through which the route candidate passes is possible; and allocate the route candidate, the continuity of which is possible, to a new path.

18 Claims, 16 Drawing Sheets

DEVICE TOPOLOGY TABLE T00

| NODE NAME | IP ADDRESS | CONNECTION DESTINATION ON SIDE01 | CONNECTION DESTINATION ON SIDE02 | CONNECTION DESTINATION ON SIDE03 | CONNECTION DESTINATION ON SIDE04 |
|---|---|---|---|---|---|
| A | 10.0.0.1 | EXTERNAL | - | D | B |
| B | 10.0.0.2 | - | A | C | - |
| C | 10.0.0.3 | B | D | EXTERNAL | - |
| D | 10.0.0.4 | A | D | - | C |

FIG. 5

DEVICE TABLE T10

| T11 NODE NAME | T12 PASSING ROUTE | T13 PORT | T14 IF TYPE | T15 NNI USED BANDWIDTH (Mbps) | T16 NNI AVAILABLE UPPER LIMIT VALUE (Mbps) |
|---|---|---|---|---|---|
| A | Side01 | A-IF01 | UNI-STM | - | - |
| | Side02 | - | - | - | - |
| | Side03 | - | NNI-Ether | 0 | 9900 |
| | Side04 | - | NNI-STM-16 | 200 | 2400 |
| B | Side01 | B-IF01 | UNI-STM | - | - |
| | Side02 | - | NNI-STM-16 | 200 | 2400 |
| | Side03 | - | NNI-STM-64 | 215 | 9700 |
| | Side04 | - | - | - | - |
| C | Side01 | - | NNI-STM-64 | 215 | 9700 |
| | Side02 | - | NNI-Ether | 290 | 9900 |
| | Side03 | C-IF01 | UNI-Ether | - | - |
| | Side04 | C-IF02 | UNI-STM | - | - |
| D | Side01 | - | NNI-Ether | 0 | 9900 |
| | Side02 | D-IF01 | UNI-Ether | - | - |
| | Side03 | D-IF02 | UNI-STM | - | - |
| | Side04 | - | NNI-Ether | 290 | 9900 |

FIG. 6

PATH TABLE T20

| PATH NAME | PATH ROUTE | START PORT | END PORT | PATH TYPE | PATH BANDWIDTH (Mbps) |
|---|---|---|---|---|---|
| PATH 1 | C→D | C-IF01 | D-IF01 | Ether | 100 |
| PATH 2 | A→B→C | A-IF01 | C-IF02 | VC-3 | 50 |
| PATH 3 | A→B→C→D | A-IF01 | D-IF02 | VC-4 | 150 |

HEADER CONVERSION RATE TABLE T30

| | PATH TYPE / IF TYPE | VC-3 (Mbps) | VC-4 (Mbps) | Ether (Mbps) |
|---|---|---|---|---|
| T32 | NNI-STM-16 | 50 | 150 | 10 |
| | NNI-STM-64 | 55 | 160 | 15 |
| | NNI-Ether | 60 | 170 | 20 |

PATH OPENING SCREEN EXAMPLE G00

| PATH OPENING | |
|---|---|
| PATH NAME : | PATH 4　　G01 |
| PATH TYPE : | VC-3　　G02 |
| PATH BANDWIDTH : | 50　　G03 |
| START PORT : | A-IF01　　G04 |
| END PORT : | D-IF01　　G05 |
| | OPEN　　G06 |

FIG. 9

NETWORK SYSTEM, MANAGEMENT COMPUTER, AND BANDWIDTH MANAGEMENT METHOD

CLAIM OF PRIORITY

The present application claims priority from Japanese patent application JP 2010-259833 filed on Nov. 22, 2010, the content of which is hereby incorporated by reference into this application.

BACKGROUND OF THE INVENTION

This invention relates to a monitor control apparatus and a monitor control program for a communication network, and more particularly, to a bandwidth management method for a packet transport network that can support various services and protocols on the same infrastructure.

A conventional network constitutes a physical network for each protocol.

Recently, a transfer network accommodating various client protocols has been required for shifting to the next-generation network providing various services.

As a method for accommodating various kinds of client protocols, a method called Multi-Protocol Label Switching (MPLS) in which an identifier called a label is added to a frame or packet and then the frame or packet is transferred has been attracting attention.

By combining the above-mentioned MPLS method, a circuit emulation technology, and an operations, administration, and maintenance (OAM) technology, it is possible to realize a packet transport network in which a plurality of types of interfaces (Synchronous Digital Hierarchy (SDH), Ethernet, etc.) can be implemented between nodes and a plurality of types of paths (virtual container (VC) path, Ethernet path, etc.) can be accommodated in the same fiber.

When a network is operated, a network monitor control apparatus is required to be provided with a function of searching for a path route that can be opened.

As a conventional route calculation method, there is a route calculation method in which the total cost of links on a route is calculated and a route whose total value is the smallest or the largest is selected.

As a typical example of such route calculation method, Dijkstra's algorithm is used.

In this route calculation method, for example, a physical bandwidth on the link is represented as the cost of link and the route whose total value of the cost of the links on the route is the largest or the smallest is calculated, to thereby calculate the route in which more packet communication traffic can be accommodated.

In the case of this route calculation method, only the total value of the cost of the links on the route is taken into consideration, and hence when the cost of one link is extremely small or large, there arises such a problem that the one link becomes a bottleneck and the traffic is interrupted.

In view of the above, an improved method for Dijkstra's algorithm has been studied in which not only the total value of cost of the links on the route but also the size of cost of each link on the route is taken into consideration, to thereby solve the problem (Japanese Patent Application Laid-open No. 2001-244974).

Further, as another route calculation method in which other conditions on the link, transferred packets, and the like are taken into consideration, the following method has been studied.

Specifically, in this method, while managing the connection state of nodes in the network, referring to such information, calculation is performed by a method similar to the Dijkstra's method on routes starting from a start node to an end node to acquire a plurality of route candidates. Then, a cost check for judging whether or not a route is available is performed on the calculated route candidates using a predetermined condition, to thereby perform a route search.

Here, the cost check refers to checking a remaining capacity, a delayed time, a transfer distance, and the like of each link, and regarding the remaining capacity, a communication capacity obtained by adding a communication capacity corresponding to a header to a communication capacity requested by a user is calculated and the calculated communication capacity is compared to the remaining capacity, to thereby judge whether or not the condition is satisfied (Japanese Patent Application Laid-open No. 2008-301225).

SUMMARY OF THE INVENTION

In the route search in the packet transport network, unlike in conventional networks, the used amount of bandwidth needs to be calculated while taking into consideration the type of link and the type of path between nodes.

In the following, description is given of problems to be considered when the used amount of bandwidth in the packet transport network is calculated.

In the packet transport network, depending on an applied area (core network, relay network, or access network), the topology of network, whether or not an existing network is to be replaced, and the like, the link bandwidth and an interface type (SDH, Ethernet, etc.) of an network node interface (NNI), which are necessary between the packet transport nodes, are different. For example, as the link type of NNIs, 10 Gbps Ethernet, 40 Gbps Ethernet, Synchronous Transport Module (STM)-16, STM-64, and the like exist in a mixed manner.

Further, it is necessary to provide to the user various kinds of paths such as the Ethernet path and a VC path (VC-3, VC-4, . . . ) depending on its use and use condition.

Depending on the type of path to be accommodated, an available bandwidth for each link type is different. This is because a method of executing control so that occurrence of burst on the Ethernet path and delay due to a long packet may not have a bad influence on transfer on the VC path is different depending on the link type.

In the path route calculation assuming bandwidth guarantee, it is necessary to verify whether or not the path can pass through the link based on the currently used bandwidth, but calculation formulae differ for each link type and path type, and hence in the case of the large-scale network, there is a problem in that an amount of calculation becomes enormous and route calculation takes a long time.

For example, the following method can be considered. All routes are calculated, the minimum value or maximum value of the cost of link is calculated for each route, and the routes are compared to each other and selected based on the calculated value. However, in this method, it is necessary to perform calculation on all routes, and hence the amount of calculation becomes enormous compared to that of the conventional Dijkstra's method.

Further, according to the method described in Japanese Patent Application Laid-open No. 2008-301225, the route candidate is first calculated and it is then verified for each route whether or not the route is available, and hence the amount of calculation becomes large as in the above-mentioned method.

It is a problem to be solved by this invention to realize a path route search in which an existing route search method is used and the above-mentioned problems are taken into consideration and to reduce an amount of calculation in the route search in a packet transport network.

A typical example to be disclosed is a network system, comprising: a plurality of data transfer devices which are coupled to each other and each transfer data; and a management computer coupled to at least one of the plurality of data transfer devices, each of the plurality of data transfer devices comprising a plurality of communication interfaces, each of which is coupled to another one of the plurality of data transfer devices, and a switch coupled to the plurality of communication interfaces, for switching a transfer direction of the data transferred between the plurality of data transfer devices, the management computer comprising an interface coupled to the at least one of the plurality of data transfer devices, a processor coupled to the interface, and a storage device coupled to the processor, wherein the management computer is configured to: store interface type information indicating a type of each of the plurality of communication interfaces, conversion information associating a type of a path to be opened in the network system, a used amount of bandwidth of the path, and a bandwidth to be allocated to the path in each type of the plurality of communication interfaces with one another, and remaining bandwidth information indicating, of the bandwidths which can be allocated to the path in the each of the plurality of communication interfaces, a remaining bandwidth which has not yet been allocated to any of the paths; select one of a plurality of the bandwidths included in the conversion information when an instruction to open a new path including a designated start point and a designated end point is given; compare the remaining bandwidth in the each of the plurality of communication interfaces included in the remaining bandwidth information to the selected one of the plurality of the bandwidths to judge whether or not the each of the plurality of communication interfaces is usable; determine a data transfer route candidate though which the data is transferred from the designated start point to the designated end point, bypassing the each of the plurality of communication interfaces which has been judged to be unusable; determine, based on the interface type information, the type of each of the plurality of communication interfaces through which the determined data transfer route candidate passes; determine, based on the conversion information, the bandwidth to be allocated to the new path in the determined type of the each of the plurality of communication interfaces; compare the remaining bandwidth of the each of the plurality of communication interfaces through which the determined data transfer route candidate passes, which is included in the remaining bandwidth information, to the determined bandwidth to be allocated to the new path in the determined type of the each of the plurality of communication interfaces, to judge whether or not continuity of the each of the plurality of communication interfaces is possible; and transmit, when the determined data transfer route candidate does not pass through the each of the plurality of communication interfaces, the continuity of which has been judged to be not possible, information for giving an instruction to allocate the determined data transfer route candidate to the new path, to the at least one of the plurality of data transfer devices coupled to the management computer.

According to one embodiment of this invention, it is possible to perform a route search at high speed using a standard algorithm without performing calculation for all types of links, and to present a route candidate to the user quickly.

Further, it is possible to manage bandwidths in a network having various restrictions easily.

BRIEF DESCRIPTION OF THE DRAWINGS

FIG. 5 is an explanatory diagram illustrating a device topology table retained by a database unit of the management computer according to the embodiment of this invention.

FIG. 6 is an explanatory diagram illustrating a device table retained by the database unit of the management computer according to the embodiment of this invention.

FIG. 7 is an explanatory diagram illustrating a path table retained by the database unit of the management computer according to the embodiment of this invention.

FIG. 8 is an explanatory diagram illustrating a header conversion rate table retained by the database unit of the management computer according to the embodiment of this invention.

FIG. 9 is an explanatory diagram illustrating a path opening screen displayed by the management computer according to the embodiment of this invention.

DETAILED DESCRIPTION OF THE PREFERRED EMBODIMENT

Figure 1:
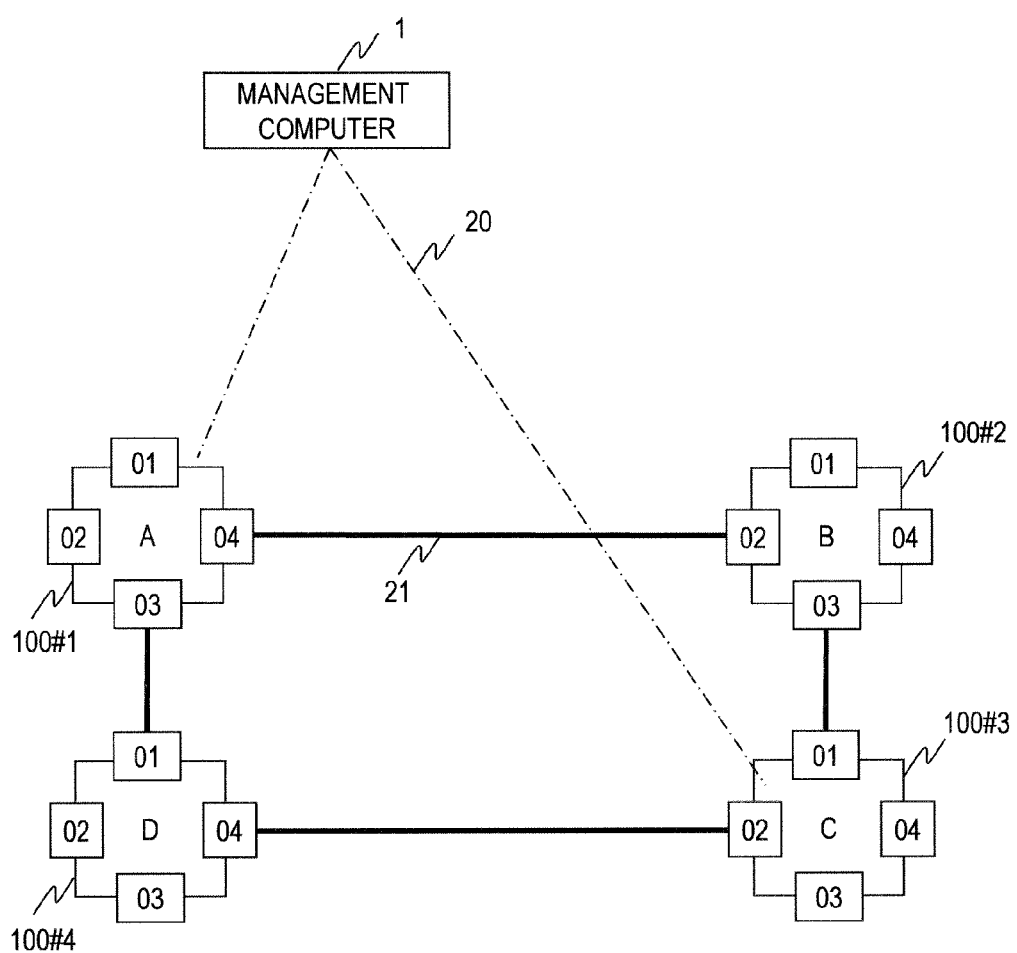
FIG. 1 is an explanatory diagram illustrating a configuration of an MPLS system according to an embodiment of this invention.

Hereinafter, referring to the drawings, the best mode for carrying out this invention is described. First, referring to FIG. 1, description is given of an example of a system configuration of MPLS nodes. FIG. 1 is an explanatory diagram illustrating a configuration of an MPLS system according to an embodiment of this invention. In the following description, a node on which an MPLS method is implemented is referred to as MPLS node.

In FIG. 1, four MPLS nodes 100#1 to 100#4 constitute a packet transport network. Here, "#1" to "#4" are suffixes assigned for discriminating among the four MPLS nodes 100. Hereinafter, when description is given of all the MPLS nodes and when description common to any of the MPLS nodes is given, the MPLS nodes 100#1 to 100#4 are referred to as MPLS nodes 100 without using the suffixes. The MPLS nodes 100 are coupled to each other via an inter-node network 21.

Each of the MPLS nodes 100 and a management computer 1 are logically coupled to each other using as gateways the MPLS nodes 100#1 and 100#3 that are coupled to the management computer 1 via a management information transfer network 20 which is different from the main line. The management computer 1 remotely monitors and controls each of the MPLS nodes 100 via the management information transfer network 20.

Connection ports in each of the MPLS nodes 100 to the inter-node network 21 are defined as "Side01", "Side02", "Side03", and "Side04". In this embodiment, each of the connection ports corresponds to a communication interface 101 for each passing route, which is illustrated in FIG. 2.

In this embodiment, each of the MPLS nodes 100 includes a maximum of four connection ports to the inter-node network 21, but this is only an example. This invention can be carried out by using the MPLS node including two or more connection ports, and an upper limit of the number of the connection ports is not provided.

FIG. 1 illustrates an example of the network, but, in carrying out this invention, there is no limitation on the type of physical network topology. For example, even when any one of a ring topology, linear topology, tree topology, and mesh topology is adopted, this invention can be carried out. Further, the same applies to the topology of the management information transfer network 20.

Figure 2:
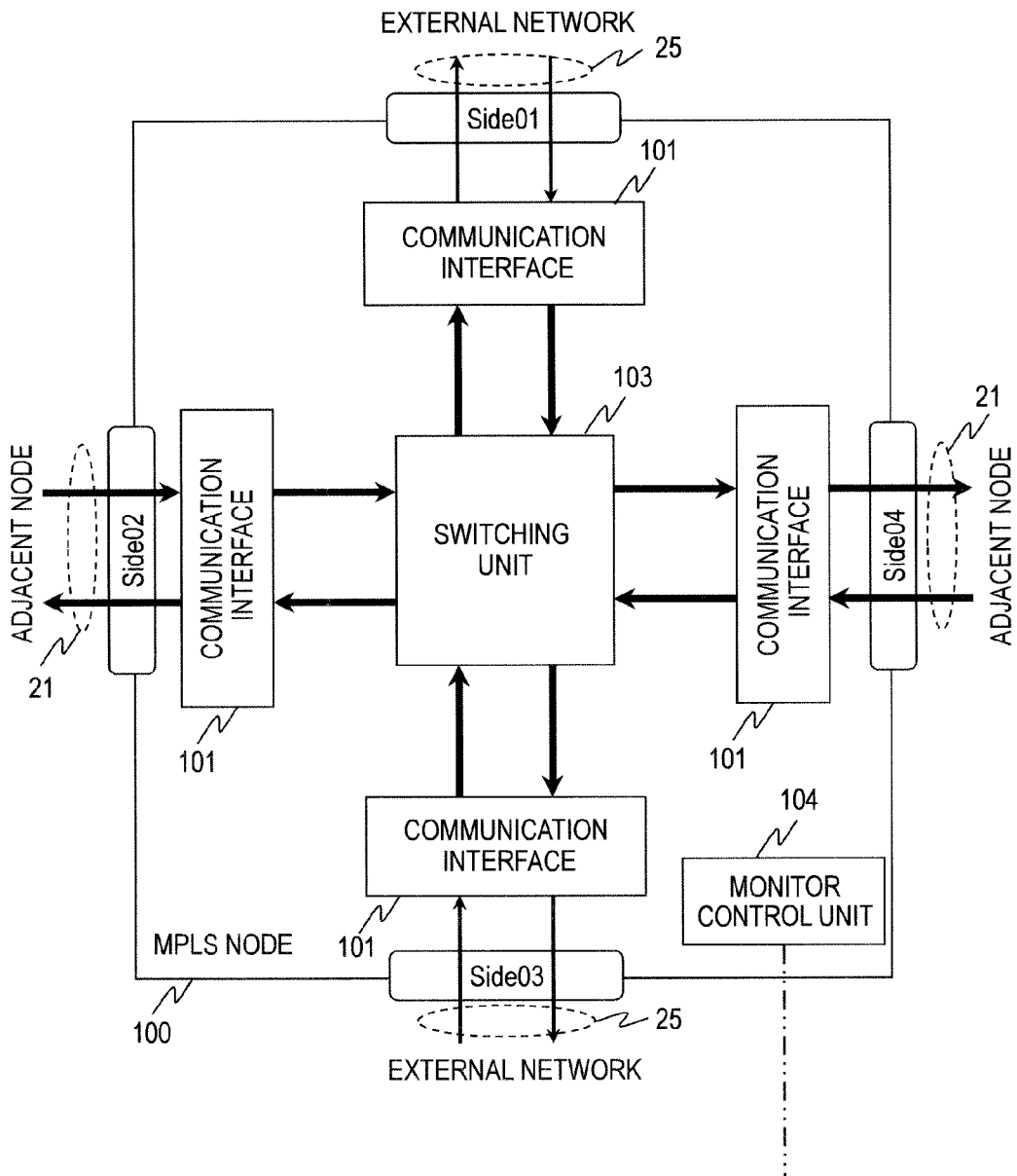
FIG. 2 is a block diagram illustrating a configuration of an MPLS node according to the embodiment of this invention.

Next, referring to FIG. 2, description is given of a configuration of each of the MPLS nodes 100. FIG. 2 is a block diagram illustrating the configuration of the MPLS node 100 according to the embodiment of this invention. In FIG. 2, the MPLS node 100 is a data transfer device including four communication interfaces 101, a switching unit 103, and a monitor control unit 104.

First, description is given of packet transfer by the MPLS nodes 100.

Specifically, description is given of the flow of a packet which is communicated between the MPLS nodes 100. The communication interface 101 of the MPLS node 100 transfers, to the switching unit 103, a packet which has been transferred from an adjacent MPLS node 100. The switching unit 103 performs switching processing in accordance with path route information described later, and transfers the packet to any one of the communication interfaces 101. The communication interface 101 transfers the packet, which has been transferred from the switching unit 103, to an adjacent MPLS node 100 via the inter-node network 21.

It should be noted that definitions for "path" and "route" are described later.

Next, description is given of the flow of packet transfer from an external network 25 to the MPLS node 100. A packet transferred from the external network 25 is transferred to the switching unit 103 via the communication interface 101. The switching unit 103 performs switching processing in accordance with the path route information, and transfers the packet to any one of the communication interfaces 101. The communication interface 101 transfers the packet, which has been transferred from the switching unit 103, to an adjacent MPLS node 100 via the inter-node network 21.

Next, description is given of the flow of packet transfer from the MPLS node 100 to the external network 25. The communication interface 101 of the MPLS node 100 transfers, to the switching unit 103, a packet which has been transferred from an adjacent MPLS node 100. The switching unit 103 performs switching processing in accordance with the path route information, and transfers the packet to any one of the communication interfaces 101. The communication interface 101 transfers the packet, which has been transferred from the switching unit 103, to the external network 25.

Description is now given of details of the respective units.

Each of the communication interfaces 101 is coupled to the inter-node network 21 or a cable provided outside the packet transport network.

The communication interface 101 coupled to the inter-node network 21 transmits/receives the packet to/from an adjacent MPLS node 100 via the inter-node network 21. Specifically, the communication interface 101 converts the packet, which has been received from the adjacent MPLS node 100, into an appropriate signal and transfers the signal to the switching unit 103. Further, conversely, the communication interface 101 converts the packet, which has been received from the switching unit 103, into an appropriate signal and transfers the signal to the adjacent MPLS node 100.

The communication interface 101 coupled to the cable provided outside the packet transport network transmits/receives the packet to/from a node provided outside the packet transport network. The above-mentioned communication interface 101 converts the packet, which has been received from the node provided outside the packet transport network, into an appropriate signal, and transfers the signal to the switching unit 103. Further, conversely, the above-mentioned communication interface 101 converts the packet, which has been received from the switching unit 103, into an appropriate signal, and transfers the signal to the node provided outside the packet transport network.

In FIG. 2, the communication interfaces 101 for the passing route Side01 and the passing route Side03 are used for a coupling to the external network 25, and the communication interfaces 101 for the passing route Side02 and the passing route Side04 are used for couplings to adjacent nodes. However, in carrying out this invention, the type of connection destination of each of the communication interfaces 101 is not fixed by its passing route, and can be determined freely. For example, the communication interface 101 for the passing route Side01 can be used for the coupling to an adjacent node. It should be noted that, for realizing that, the communication interface 101 of a type suited for the coupling to the adjacent node needs to be implemented as the communication interface 101 for the passing route Side01.

The communication interfaces 101 coupled to the adjacent nodes have a plurality of interface types, and differ from each other in usable bandwidth. Here, the communication interface 101 coupled to the adjacent node is referred to as network node interface (NNI). The communication interface 101 coupled to the external network 25 have a plurality of interface types corresponding to path types. Here, the communication interface 101 coupled to the external network 25 is referred to as user network interface (UNI). A feature of the packet transport network described in this embodiment is that, under the condition that there are a plurality of kinds of UNIs conforming to the link type of the NNI (in other words, the type of the communication interface) and the path type, the packet can be transferred via arbitrary NNIs regardless of the path type. Therefore, consideration needs to be given to the bandwidth used by a header that varies depending on the combination of UNIs conforming to the link type of the NNI and path type, which corresponds to the problem to be solved by this invention. This invention can be carried out even in a case where a type of each communication interface 101 is added.

The switching unit 103 refers to labels and input ports attached to the received packet, and then transfers the packet to the communication interface 101 in accordance with the path route information set in the MPLS node 100. A method of setting paths in the MPLS node 100 and the switching unit 103 is described later as processing performed by a path management module 48.

The monitor control unit 104 collects an alert and an event notification detected by the communication interface 101 or the switching unit 103, and notifies the management computer 1 of the result thereof. Further, the monitor control unit 104 makes settings on the path route information for the switching unit 103 in accordance with the control from the management computer 1.

It should be noted that the monitor control units 104 of the MPLS node 100#1 and the MPLS node 100#3 of FIG. 1 are coupled to the management computer 1 via the management information transfer network 20. Therefore, the monitor control units 104 of those MPLS nodes 100 communicate with the management computer 1 via the management information transfer network 20. Meanwhile, the monitor control units 104 of the MPLS node 100#2 and the MPLS node 100#4 of FIG. 1 communicate with the management computer 1 via the inter-node network 21, the MPLS node 100#1 or the MPLS node 100#3, and the management information transfer network 20.

Description is now given of the definitions for "path" and "route". The "path" in this embodiment is a communication path of the packet, which is set for providing a desired service to a user, and is defined by two ports of the UNI corresponding to a start point and an end point of the communication path (in other words, entrance and exit of the packet transport network). On the other hand, the "route" in this embodiment is a data transfer route through which the packet is actually communicated in the packet transport network, and is defined by the MPLS nodes 100 through which the packet is communicated (more precisely, NNIs through which the packet is communicated). There may be a plurality of routes which can be allocated to one path, and in that case, one of the plurality of routes is allocated to the path. In this embodiment, a "path route" refers to the route allocated to the path.

For example, in the network illustrated in FIG. 1, in a case where a user terminal (not shown) coupled to the connection port "Side01" of the MPLS node 100#1 is to receive a service from a server (not shown) coupled to the connection port "Side03" of the MPLS node 100#4, a path through which the packet is communicated between those connection ports is set. In this case, there are two routes which can be allocated to the set path. In a first route, the packet is communicated via the connection port "Side03" of the MPLS node 100#1 and the connection port "Side01" of the MPLS node 100#4. In a second route, the packet is communicated via the connection port "Side04" of the MPLS node 100#1, the connection port "Side02" of the MPLS node 100#2, the connection port "Side03" of the MPLS node 100#2, the connection port "Side01" of the MPLS node 100#3, and the connection port "Side02" of the MPLS node 100#3, and the connection port "Side04" of the MPLS node 100#4. One of those routes is allocated to the set path, and is used for communicating the packet between the user terminal and the server.

Figure 12:
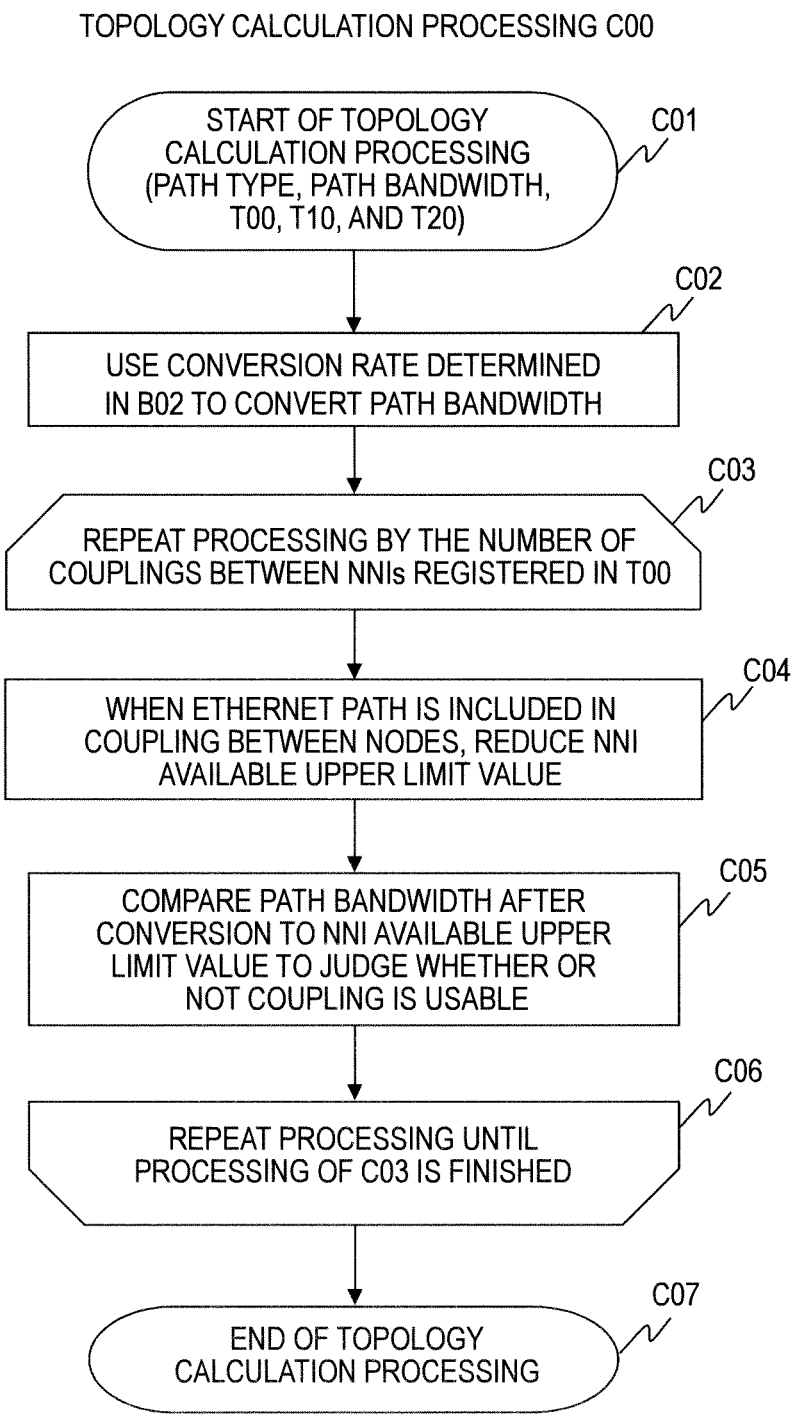
FIG. 12 is a flowchart illustrating a topology calculation processing executed by the management computer according to the embodiment of this invention.
Figure 14:
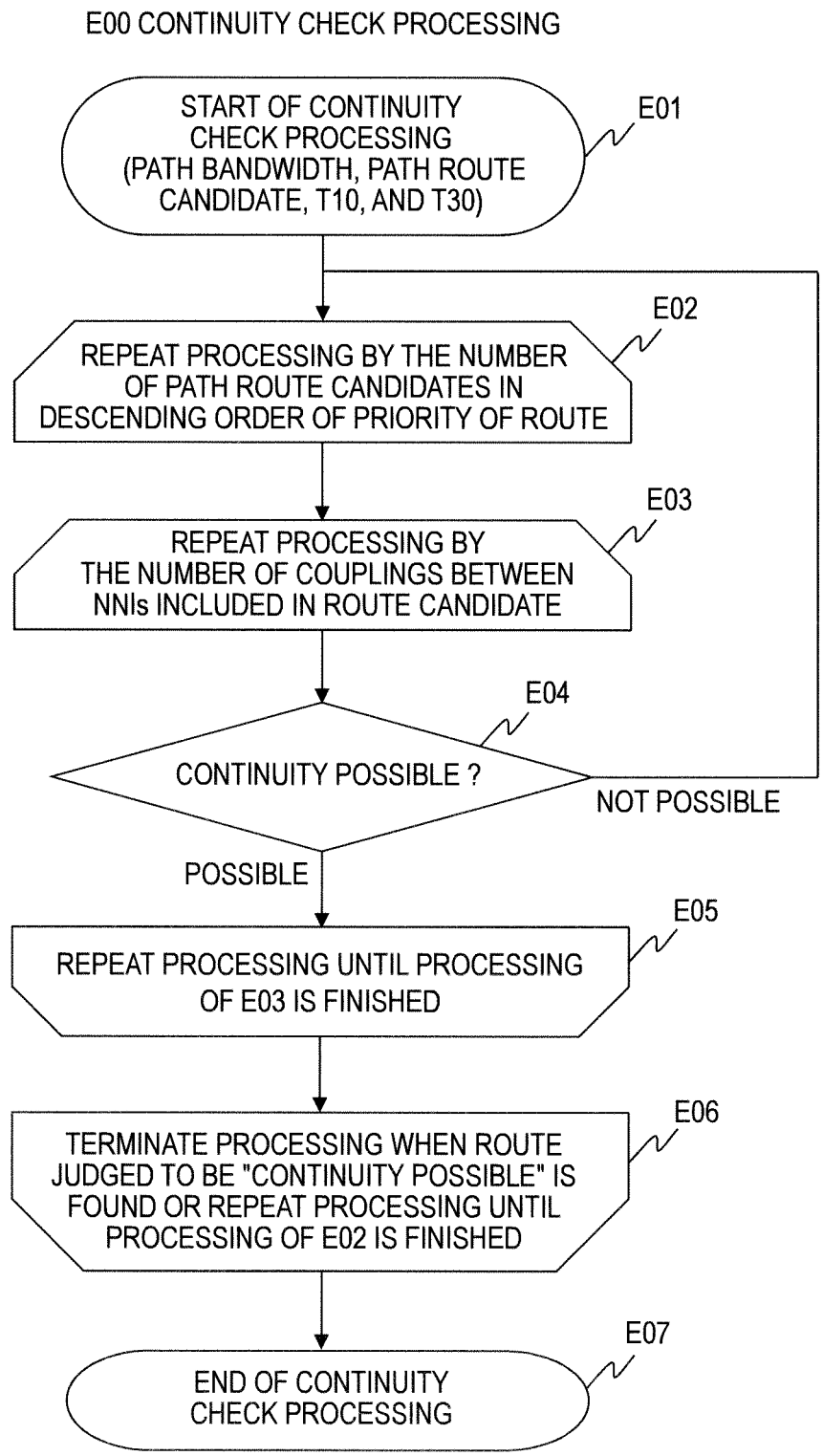
FIG. 14 is a flowchart illustrating a continuity check processing executed by the management computer according to the embodiment of this invention.

It should be noted that, in the description of this embodiment, the inter-node network 21 is also referred to as "coupling between the MPLS nodes" or "link". In FIG. 1, four thick solid lines connecting adjacent MPLS nodes 100 to each other each correspond to the link. Further, in the following description, the type of link has the same meaning as the type of NNIs provided on both ends of the link, which is illustrated in FIG. 6 or other figures, the remaining bandwidth of the link has the same meaning as the remaining bandwidth of the NNIs provided on both ends of the link, which is illustrated in FIG. 6 or other figures, the fact that the link is usable has the same meaning as the fact that the NNIs provided on both ends of the link are usable, which is illustrated in FIG. 12 or other figures, and the fact that the link can be continued has the same meaning as the fact that the NNIs provided on both ends of the link can be continued, which is illustrated in FIG. 14 or other figures.

Next, description is given of the management computer 1. The management computer 1 is a general information processing apparatus such as a personal computer (PC) or a workstation (WS), which has software for managing a path installed thereon and is activated by the user.

Figure 3:
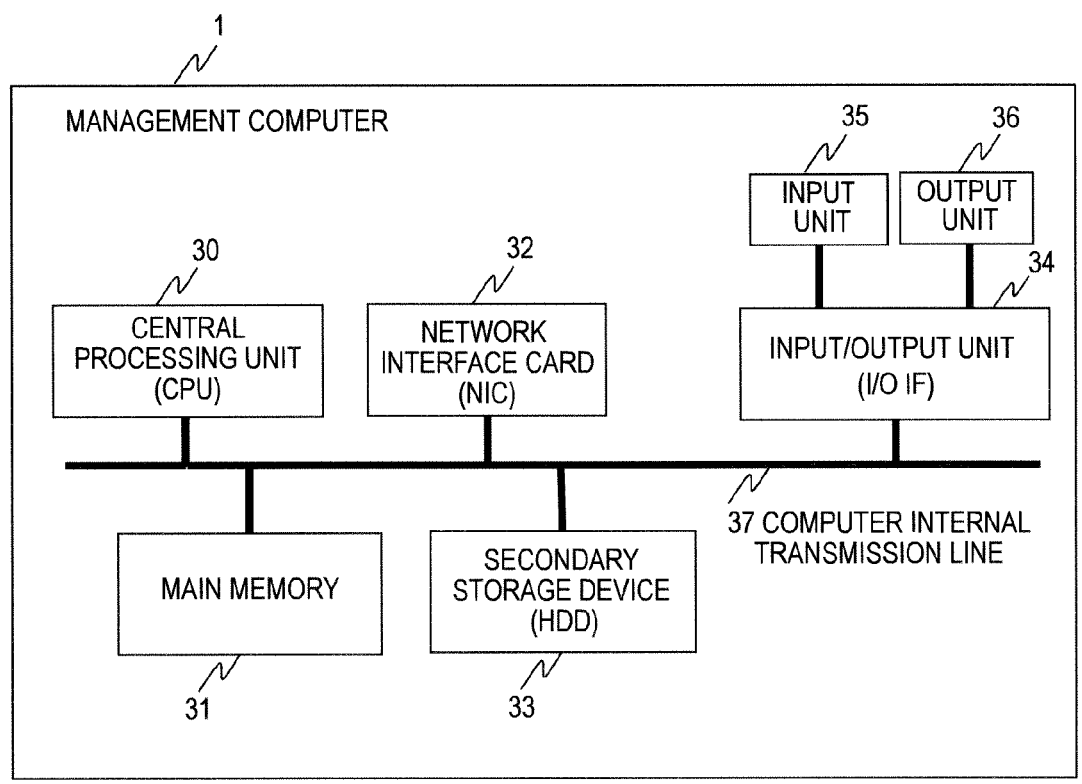
FIG. 3 is a hardware block diagram illustrating a management computer according to the embodiment of this invention.

Referring to FIG. 3, description is given of a hardware configuration of the management computer 1. Here, FIG. 3 is a hardware block diagram illustrating the management computer 1 according to the embodiment of this invention. In FIG. 3, the management computer 1 includes a central processing unit (CPU) 30, a main memory 31, a network interface card (NIC) 32, an input/output unit 34, and an secondary storage device 33, which are connected to each other via an internal transmission line 37, and an input unit 35 and an output unit 36 that are connected to the input/output unit 34.

Figure 4:
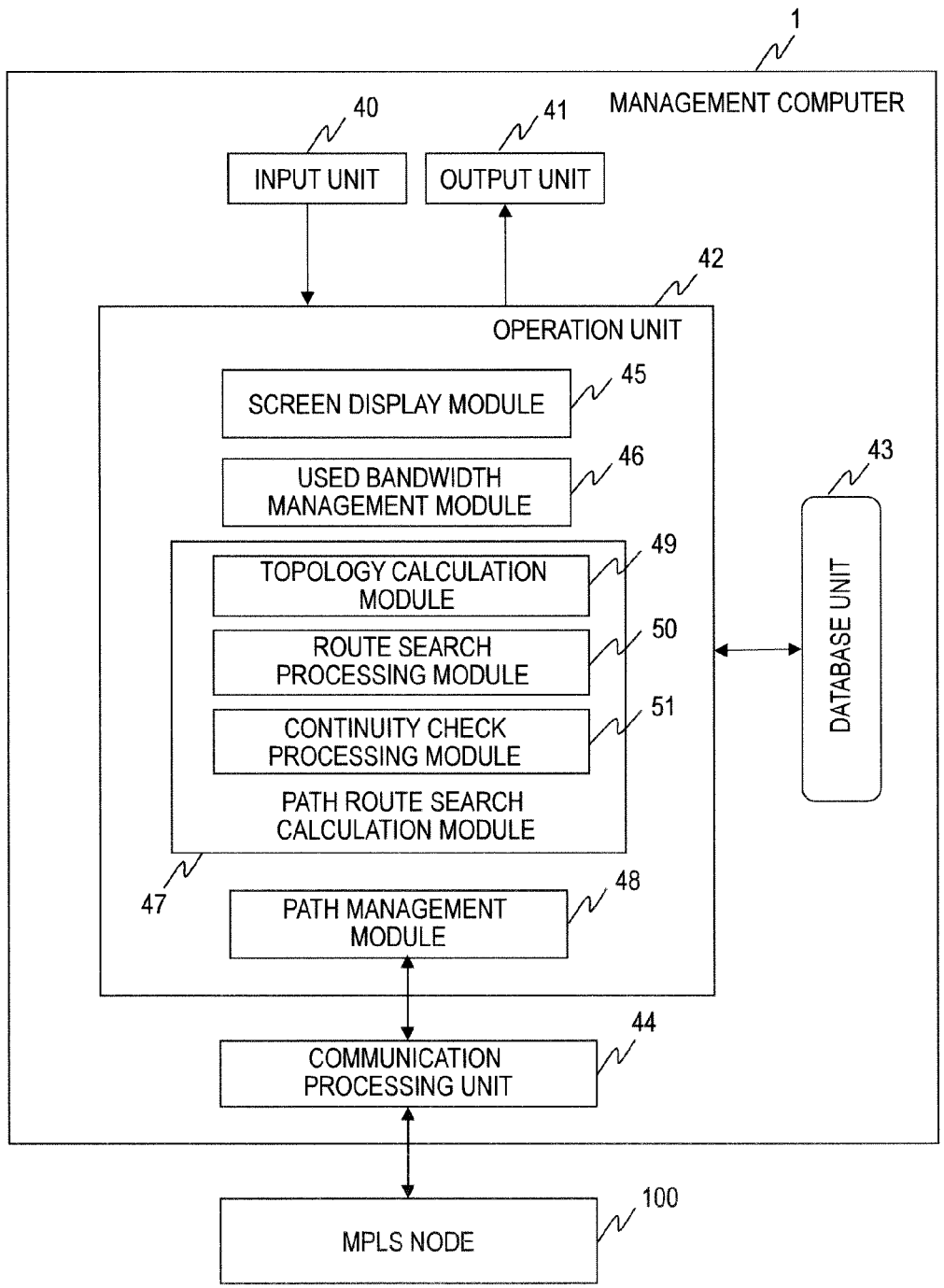
FIG. 4 is a functional block diagram illustrating the management computer according to the embodiment of this invention.

Referring to FIG. 4, description is given of a functional configuration of the management computer 1. Here, FIG. 4 is a functional block diagram illustrating the management computer 1 according to the embodiment of this invention. As is clear from the comparison between FIG. 3 and FIG. 4, functions 45 to 51 of an operation unit 42 are realized by the CPU 30 executing programs on the main memory 31.

In FIG. 4, the management computer 1 is operated by the user using an input unit 40 and an output unit 41. The operation unit 42 performs arithmetic operation which is necessary for monitoring and controlling the MPLS node 100, and retains necessary information in a database unit 43. When executing a command for the MPLS node 100, the operation unit 42 transmits a communication command to a communication processing unit 44, to thereby realize the communication between the management computer 1 and the MPLS node 100. The operation unit 42 includes a screen display module 45, a used bandwidth management module 46, a path route search calculation module 47, and the path management module 48.

The screen display module 45 displays a path opening screen G00 of FIG. 9 which the user operates to open a path. Details of the path opening screen G00 are described later referring to FIG. 9.

The used bandwidth management module 46 manages, after the path opening is executed, in the database unit 43, the used bandwidths of NNIs coupled between the MPLS nodes 100.

The path route search calculation module 47 uses values of a path type G02, a path bandwidth G03, a start port G04, and an end port G05, which are input when the path is to be opened, to search for an openable path route.

The path route search calculation module 47 includes a topology calculation module 49, a route search processing module 50, and a continuity check processing module 51.

The path management module 48 generates, based on the result of the calculation performed by the path route search calculation module 47, label switching information corresponding to the path route (in other words, cross-connect information including input IF information, input label information, output interface information, and output label information), and transmits a path opening command, to which the label switching information is added, to each of the MPLS nodes 100 via the communication processing unit 44. Further, after executing the path opening, the path management module 48 updates information on the newly opened path in the database unit 43.

The topology calculation module 49, the route search processing module 50, and the continuity check processing module 51 are in charge of topology calculation processing C00 of FIG. 12, route search processing D00 of FIG. 13, and continuity check processing E00 of FIG. 14, respectively, and those sets of processing are described later referring to FIGS. 12 to 14.

FIGS. 5 to 8 illustrate tables retained by the database unit 43 of the management computer 1. Referring to FIGS. 5 to 8, description is given of details of each of the tables.

FIG. 5 is an explanatory diagram illustrating a device topology table T00 retained by the database unit 43 of the management computer 1 according to the embodiment of this invention.

In each of the MPLS nodes 100, after implementing the communication interfaces 101 and performing hardware connection such as connection of cables in the device and connection of the inter-MPLS node network, the user registers, with the management computer 1, information on the MPLS node 100 as the device topology table T00. In FIG. 5, the device topology table T00 contains fields for a node name T01, an IP address T02, a connection destination T03 on the side of Side01, a connection destination T04 on the side of Side02, a connection destination T05 on the side of Side03, and a connection destination T06 on the side of Side04.

One row of the device topology table T00 contains information on one MPLS node 100, and the number of rows varies depending on the number of the MPLS nodes 100 constituting the packet transport network.

The node name T01 is information for identifying the respective MPLS nodes 100. For example, "A" to "D" respectively attached to the MPLS nodes 100#1 to 100#4 illustrated in FIG. 1 are registered as the node name T01.

The IP address T02 is an Internet protocol (IP) address of each of the MPLS nodes 100.

The connection destinations T03 on the side of Side01 to the connection destination T06 on the side of Side04 are each information indicating the connection destination of each of the connection ports, specifically, information for identifying an adjacent node coupled to the communication interface 101 corresponding to each passing route via the inter-node network 21 or the external network 25.

For example, "External" is registered as the connection destination T03 on the side of Side01 corresponding to the value "A" of the node name T01. This means that the communication interface 101 of the MPLS node 100#1 corresponding to the passing route Side01 is coupled to a node provided outside the packet transport network via the external network 25. Meanwhile, "B" is registered as the connection destination T06 on the side of Side04 corresponding to the value "A" of the node name T01, and "A" is registered as the connection destination T04 on the side of Side02 corresponding to the value "B" of the node name T01. This means that the communication interface 101 of the MPLS node 100#1 corresponding to the passing route Side04 and the communication interface 101 of the MPLS node 100#2 corresponding to the passing route Side02 are coupled to each other via the inter-node network 21, in other words, that the MPLS node 100#1 and the MPLS node 100#2 are adjacent nodes.

This way, a coupling relationship among the MPLS nodes 100 is specified based on the device topology table T00.

FIG. 6 is an explanatory diagram illustrating a device table T10 retained by the database unit 43 of the management computer 1 according to the embodiment of this invention.

When registering the communication interface 101 of each node with the management computer 1, the user adds, to the device table T10, information for associating each of the passing routes Side01, Side02, Side03, and Side04 with the communication interface 101. Further, after path opening processing, the management computer 1 updates a used amount of bandwidth of the communication interface 101 registered in the device table T10. In FIG. 6, the device table T10 contains fields for a node name T11, a passing route T12, a port T13, an interface type T14, an NNI used bandwidth T15, and an NNI available upper limit value T16.

The node name T11 is information for identifying each MPLS node 100, and corresponds to the node name T01 of the device topology table T00.

The passing route T12 indicates a passing route of the communication interface 101 of each of the MPLS nodes 100, and, for example, Side01 to Side04 illustrated in FIG. 2 are registered.

The port T13 is information for identifying a port number of the UNI provided to the user.

The interface type T14 indicates the type of the communication interface 101 corresponding to each passing route. Specifically, as the interface type T14, information indicating whether each of the communication interfaces 101 is the UNI or the NNI, information indicating an interface type for each case (for example, SDH or Ethernet), and the like are registered.

The NNI used bandwidth T15 indicates a bandwidth already allocated to each NNI.

The NNI available upper limit value T16 indicates an upper limit value of the bandwidth that can be allocated to each NNI. In other words, in each NNI, if a total value of the bandwidth allocated to the path exceeds the value of the NNI available upper limit value T16, a bottleneck occurs in the NNI. FIG. 6 illustrates the example in which an upper limit value of the bandwidth is registered for each NNI, but an upper limit value of the bandwidth is generally determined depending on the type of NNI, and hence, in place of the NNI available upper limit value T16, information associating the type of NNI with an upper limit value of the bandwidth may be retained in the database unit 43.

It should be noted that, as described later, the NNI used bandwidth T15 and the NNI available upper limit value T16 are referred to for determining, when a new path is to be opened, a route to be allocated to the path. More specifically, it is judged whether or not the bandwidth that can be allocated to the route remains in the NNI based on the NNI used bandwidth T15 and the NNI available upper limit value T16. In other words, the NNI used bandwidth T15 and the NNI available upper limit value T16 are information that is equivalent to the NNI remaining bandwidth (in other words, value obtained by subtracting the bandwidth already allocated from the upper limit value). Therefore, in place of the NNI used bandwidth T15 and the NNI available upper limit value T16, a value indicating the NNI remaining bandwidth itself may be retained.

FIG. 7 is an explanatory diagram illustrating a path table T20 retained by the database unit 43 of the management computer 1 according to the embodiment of this invention.

The management computer 1 adds, when the path opening is executed, path information in the path table T20. In FIG. 7, the path table T20 contains fields for a path name T21, a path route T22, a start port T23, an end port T24, a path type T25, and a path bandwidth T26.

The path name T21 is information for identifying an opened path.

The path route T22 indicates a route allocated to the opened path. Specifically, as the path route T22, information for identifying the MPLS nodes through which the path route passes.

The start port T23 and the end port T24 indicate the start point and the end point of the opened path, respectively.

The path type T25 indicates the type of the opened path (for example, Ethernet, VC-3, or VC-4).

The path bandwidth T26 indicates a bandwidth used by the opened path.

For example, in FIG. 7, as the path route T22, the start port T23, the end port T24, the path type T25, and the path bandwidth T26 which correspond to the value "Path 1" of the path name T21, "C→D", "C-IF01", "D-IF01", "Ether", and "100" are registered, respectively. This means that the path identified by "Path 1" is opened between a port C-IF01 of the communication interface 101 corresponding to the passing route Side03 of the MPLS node 100#3 and a port D-IF01 of the communication interface 101 corresponding to the passing route Side02 of the MPLS node 100#4, that a route passing through a link coupling the MPLS node 100#3 to MPLS node 100#4 (in other words, route passes through NNIs provided on both ends of the link) is allocated to the path, and that the user uses the path as the Ethernet path of 100 Mbps.

It should be noted that, in the example of FIG. 7, the NNIs through which the path route passes are not illustrated. However, by referring to the path route T22, the device topology table T00, and the device table T10, the NNIs through which the path route passes can be specified.

FIG. 8 is an explanatory diagram illustrating a header conversion rate table T30 retained by the database unit 43 of the management computer 1 according to the embodiment of this invention.

The management computer 1 retains, in the header conversion rate table T30, the header conversion rate used when the path route search calculation module 47 executes a path route search. The header conversion rate is a value corresponding to the type of the communication interface 101 and the path type.

In this embodiment, a route including a plurality of types of the communication interface 101 may be allocated to the opened path in some cases. Therefore, in the MPLS node 100, if a packet is transferred from one type of the communication interface 101 to another type of the communication interface 101 via the switching unit 103, the format of the packet is converted, and as necessary, for example, header information is added thereto. An data amount contained in the packet fluctuates due to such conversion, and hence the bandwidth to be allocated to the path route in each of the communication interfaces 101 is determined depending on the combination of the type of the path to be opened and the type of each of the communication interfaces 101. In the header conversion rate table T30, information associating the combination of the type of path and the type of the communication interface 101 with the bandwidth to be allocated is retained.

Specifically, in this embodiment, in the case of the VC-3 path and the VC-4 path, the bandwidth necessary for opening the path is retained, and in the case of the Ethernet path, the bandwidth required to be added to the path bandwidth corresponding to the header is retained.

In FIG. 8, the header conversion rate table T30 includes a type T32 of the communication interface 101 for the communication between the MPLS nodes, which corresponds to the vertical axis, and a path type T31 which can be accommodated by the communication interface 101 coupled to the external network 25, which corresponds to the horizontal axis.

For example, in FIG. 8, as the path types T31, three path types, specifically, VC-3, VC-4, and Ethernet are registered, and as the interface type T32, three interface types, specifically, NNI-STM-16, NNI-STM-64, and NNI-Ether are registered. Further, for example, "50" is registered as the value corresponding to VC-3 and NNI-STM-16, "55" is registered as the value corresponding to VC-3 and NNI-STM-64, and "60" is registered as the value corresponding to VC-3 and NNI-Ether. This means that if the route of NNI-STM-16 is allocated to the VC-3 path, the bandwidth of 50 Mbps needs to be allocated to the route, that if the route of NNI-STM-64 is allocated to the VC-3 path, the bandwidth of 55 Mbps needs to be allocated to the route, and that the route of NNI-Ether is allocated to the VC-3 path, the bandwidth of 60 Mbps needs to be allocated to the route.

It should be noted that, FIG. 8 illustrates the example in which the value indicating the bandwidth itself associated with the combination of the path type and the type of the communication interface 101 is retained, but any value can be retained as long as the value contains information from which the bandwidth to be allocated can be specified. For example, in place of the value indicating the bandwidth itself to be allocated, information indicating a reference value of the bandwidth and a ratio (rate) by which the reference value is to be multiplied may be retained, or information indicating a ratio by which a value input as the path bandwidth G03, which is illustrated in FIG. 9, is to be multiplied may be retained.

The number of rows and the number of columns of the header conversion rate table T30 vary depending on the number of the types of the communication interfaces for the communication between the MPLS nodes and the number of the path types which can be accommodated in the communication interface 101 coupled to the external network 25. In the header conversion rate table T30, in the packet transport network in which the path is to be opened, information on bandwidths corresponding to all combinations of all path types that may be opened and all types of the communication interfaces that exist on the network needs to be registered.

FIG. 9 is an explanatory diagram illustrating the path opening screen G00 displayed by the management computer 1 according to the embodiment of this invention.

The screen display module 45 of the management computer 1 displays the path opening screen G00. The user inputs a path name G01, the path type G02, the path bandwidth G03, the start port G04, and the end port G05. It should be noted that the path bandwidth (in other words, bandwidth to be used by the path) may be fixedly determined by the path type in some cases, and in that case, the user does not need to input the path bandwidth G03. When the user operates an open button G06, the management computer 1 confirms whether or not the path name G01, the path type G02, the path bandwidth G03, the start port G04, and the end port G05 are normally input, and executes path opening processing A00. The path opening processing A00 is described later referring to FIG. 10.

Figure 10:
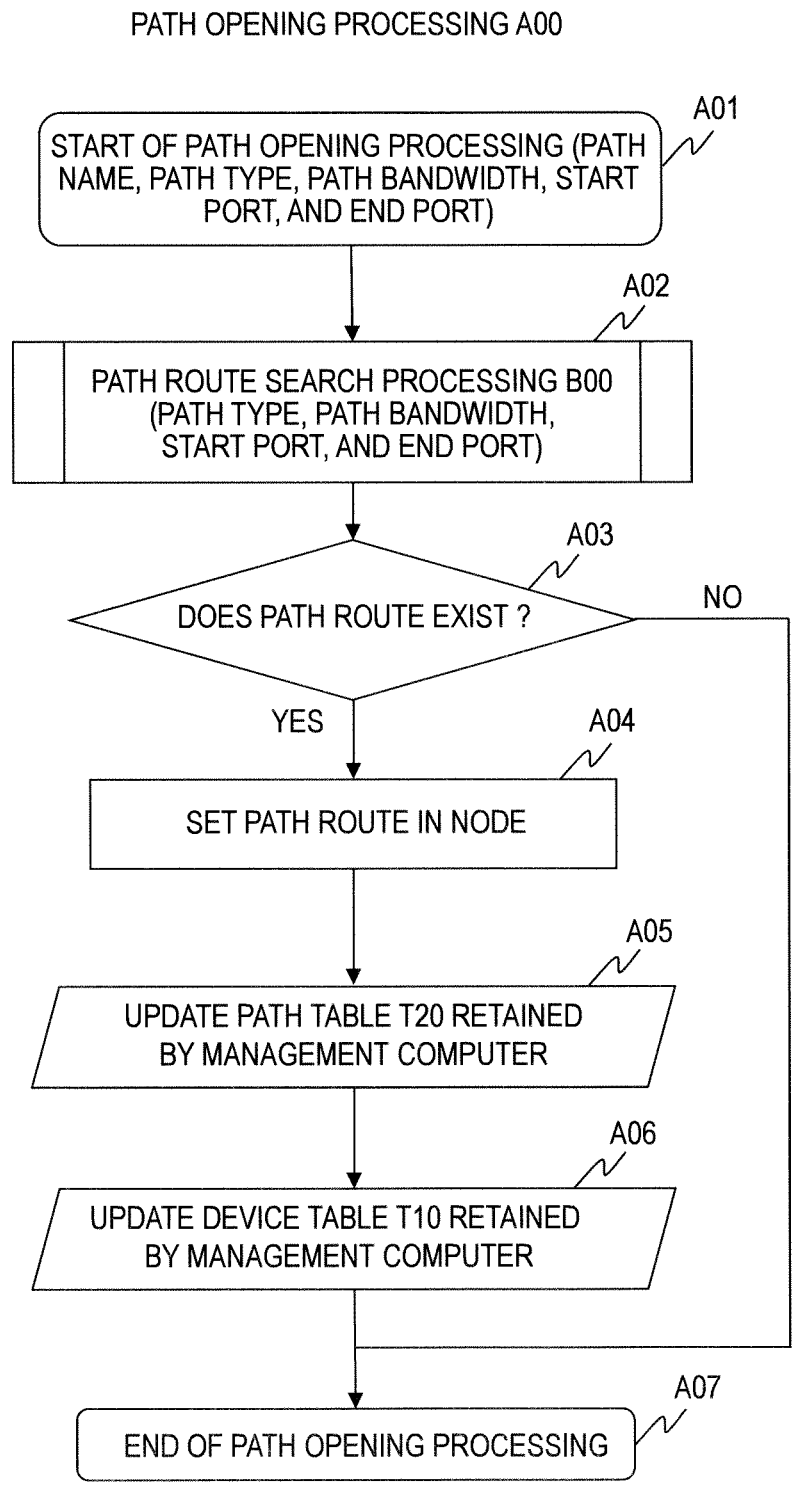
FIG. 10 is a flowchart illustrating a path opening processing executed by the management computer according to the embodiment of this invention.

FIG. 10 is a flowchart illustrating the path opening processing A00 executed by the management computer 1 according to the embodiment of this invention.

Using the path name, the path type, the path bandwidth, the start port, and the end port which the user inputs on the path opening screen G00, the management computer 1 starts the path opening processing (A01).

Using the path type, the path bandwidth, the start port, and the end port, which are input in Step A01, and sets of table information retained in the database unit 43, the path route search calculation module 47 of the management computer 1 determines the path route (A02). Details of path route search processing B00 executed in Step A02 are described later referring to FIG. 11.

Next, the path management module 48 of the management computer 1 judges whether or not the path route has been acquired by the path route search calculation module 47 (A03). If the path route cannot be acquired, the path management module 48 judges that the path cannot be opened, and then terminates the processing (A07).

If the path route has been acquired, the path management module 48 of the management computer 1 transmits the path route acquired in Step A02 to the communication processing unit 44. The communication processing unit 44 communicates the path route to each of the MPLS nodes 100. The monitor control unit 104 of the each of the MPLS nodes 100 sets, based on the path route transmitted from the management computer 1, the path route information (not shown) to be retained by the each of the MPLS nodes 100 (A04).

The path route information retained by each of the MPLS nodes 100 at least includes information associating an input interface, an input label, an output interface, and an output label with one another. The switching unit 103 of each of the MPLS nodes 100 changes the value of the label in accordance with the path route information when the packet having the label attached thereto is transferred from the communication interface 101, and transfers the packet to the communication interface 101 corresponding to the passing route determined in accordance with the path route information. This way, in accordance with the path route information, the switching unit 103 changes the label attached to the packet and switches the direction in which the packet is transferred. Such settings on the path route information and transfer of the packet based on the settings are the same as those of the conventional MPLS node, and hence further description thereof is omitted.

Then, the path management module 48 of the management computer 1 adds the path name G01, the path type G02, the path bandwidth G03, the start port G04, and the end port G05, which are input in Step A01, to the path name T21, the path type T25, the path bandwidth T26, the start port T23, and the end port T24, respectively, of the new row of the path table T20 retained by the database unit 43 of the management computer 1. Further, the path management module 48 adds the path route acquired in the path route search processing B00 to the path route T22 of the above-mentioned new row (A05).

Next, the used bandwidth management module 46 of the management computer 1 updates, based on the path type and the path bandwidth, which are input in Step A01, the interface type T14 of the device table T10, the header conversion rate table T30, and the path route acquired by the path route search processing, the NNI used bandwidth T15 of the device table T10 retained by the database unit 43 of the management computer 1 (A06).

Specifically, the used bandwidth management module 46 uses the values of the header conversion rate table T30 corresponding to the type of the opened path and the interface type of NNIs on the allocated route to calculate the bandwidth to be used by the opened path route in the NNIs on the path route (in other words, the bandwidth to be allocated to the path route), and then adds the calculated value to the value of the NNI used bandwidth T15 corresponding to each NNI.

With this processing, the management computer 1 terminates the path opening processing A00 (A07).

Figure 11:
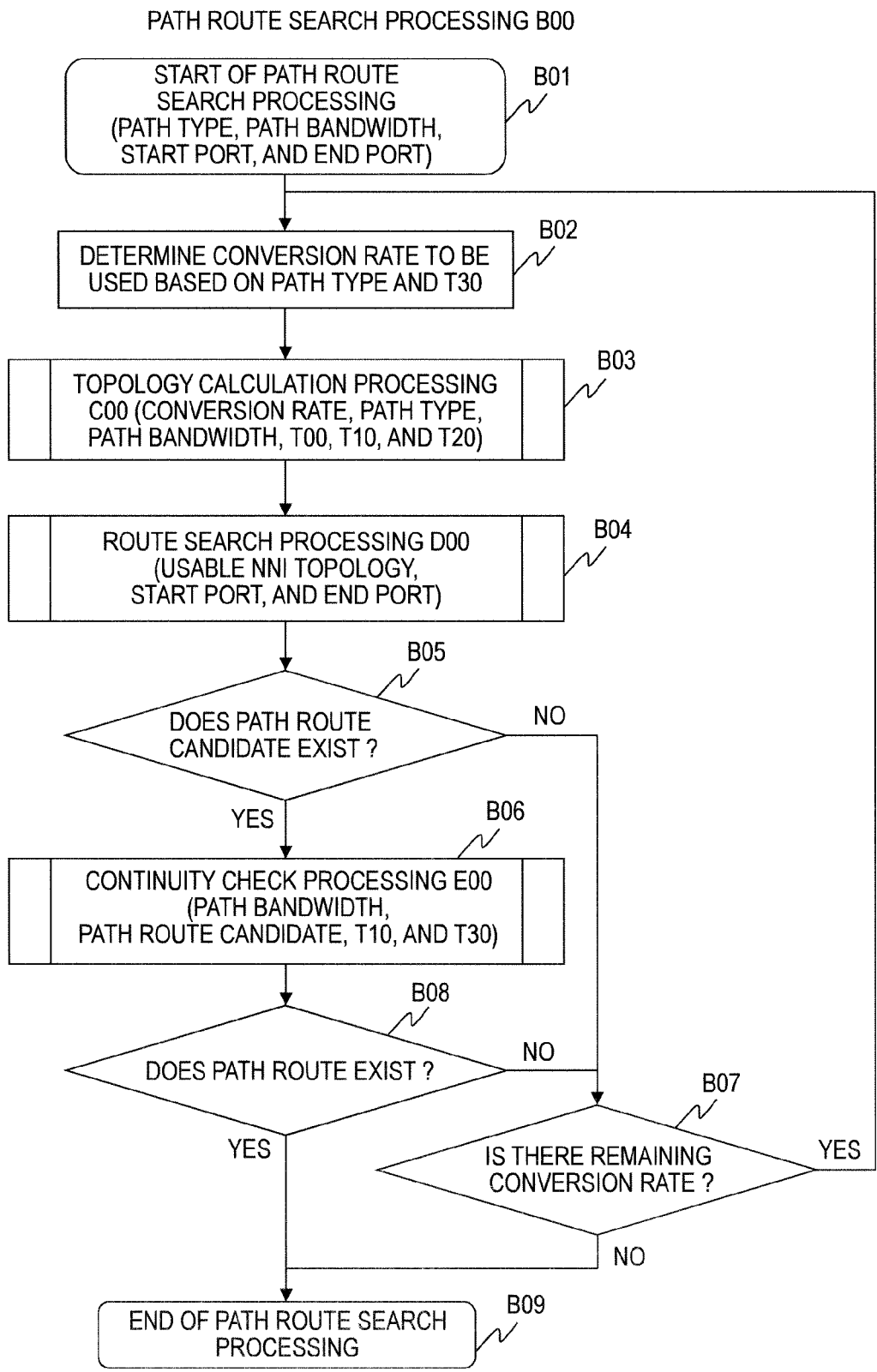
FIG. 11 is a flowchart illustrating a path route search processing executed by the management computer according to the embodiment of this invention.

FIG. 11 is a flowchart illustrating the path route search processing B00 executed by the management computer 1 according to the embodiment of this invention. The path route search processing B00 is executed in Step A02 of the path opening processing A00.

Using the path type, the path bandwidth, the start port, and the end port which are input in Step A01 of the path opening processing, the path route search processing is started (B01).

First, the path route search calculation module 47 determines, based on the path type and the header conversion rate table T30, a conversion rate to be used in the topology calculation processing C00 (B02). Specifically, the path route search calculation module 47 refers to the header conversion rate table T30 to select a bandwidth that has not been selected yet from among the bandwidths corresponding to the type of the path to be opened (in other words, the path type G02 input by the user). Any bandwidth that has not been selected yet may be selected, but in this embodiment, the largest value is selected.

For example, in a case where "VC-3" is input as the path type as illustrated in FIG. 9, the path route search calculation module 47 selects any one of the bandwidths of "50 Mbps", "55 Mbps", and "60 Mbps" which are registered in the header conversion rate table T30 and correspond to VC-3. In a case where the processing of Step B02 is executed for the first time, no bandwidth has been selected yet, and hence any one of the above-mentioned bandwidths may be selected, but in this embodiment, the largest value, in other words, "60 Mbps" is selected.

Next, the topology calculation module 49 of the management computer 1 receives, as inputs, the conversion rate, the path type, the path bandwidth, the device topology table T00, the device table T10, and the path table T20 to determine a usable NNI topology (B03). Details of the topology calculation processing C00 executed in this step are described later referring to FIG. 12.

Then, the route search processing module 50 of the management computer 1 uses the usable NNI topology, the start port, and the end port which are acquired by the topology calculation processing B03 to determine a path route candidate (B04). Details of the route search processing D00 executed in this step are described later referring to FIG. 13.

Next, the path route search calculation module 47 judges whether or not the path route candidate can be acquired by the route search processing B04 (B05). If the path route candidate exists, the continuity check processing module 51 of the management computer 1 performs continuity check on the path route candidate based on the path route candidate acquired by the route search processing D00 and the header conversion rate table T30 (B06). Then, the path route search calculation module 47 judges whether or not the path route candidate that can be continued exists (B08), and if such a path route candidate exists, executes the processing of Step B09. If such a path route candidate does not exist, the path route search calculation module 47 executes the processing of Step B07.

Details of the continuity check processing E00 executed in Step B06 are described later referring to FIG. 14.

If the path route candidate does not exist, and if the path route candidate that can be continued does not exist, it is judged whether or not the condition on the header conversion rate can be changed (B07). Specifically, if the bandwidth that has not been selected yet remains in the header conversion rate table T30, it is judged that the condition can be changed. If it is judged that the condition can be changed, the path route search calculation module 47 executes the processing of B02. For example, if "60 Mbps" has been selected in Step B02 and "50 Mbps" and "55 Mbps" have not been selected yet, it is judged in Step B07 that the condition can be changed, and in the following Step B02, the largest value of the values that have not been selected yet, in other words, "55 Mbps" is selected. On the other hand, if it is judged that the condition cannot be changed, the path route search calculation module 47 executes the processing of B09.

With this processing, the management computer 1 terminates the path route search processing B00 (B09).

FIG. 12 is a flowchart illustrating the topology calculation processing C00 executed by the management computer 1 according to the embodiment of this invention.

The topology calculation module 49 of the management computer 1 receives, as inputs, the path type, the path bandwidth, the device topology table T00, the device table T10, and the path table T20 to start the topology calculation processing (C01).

Next, the topology calculation module 49 of the management computer 1 uses the conversion rate determined in Step B02 to convert the path bandwidth (C02). In a case where the ratio is determined in Step B02, by multiplying the value of the path bandwidth as a reference by the ratio, the bandwidth to be allocated is calculated. On the other hand, as illustrated in FIG. 8, in a case where the bandwidth itself is determined in Step B02, no processing needs to be executed in this step.

Then, the topology calculation module 49 of the management computer 1 repeats the processing of C04, C05, and C06 by the number of couplings between the MPLS nodes registered in the device topology table T00 (C03). In the example of FIGS. 5 and 1, four couplings between the MPLS nodes are registered, and hence the execution of Steps C04 to C06 on each coupling is repeated four times.

First, the topology calculation module 49 of the management computer 1 refers to the input value of the path type G02 of the path opening screen and the path route T22 and the path type T25 of the path table T20 to judge whether or not the Ethernet path exists between the MPLS nodes, and if the Ethernet path exists, reduces the NNI available upper limit value T16 corresponding to the coupling between the MPLS node by a predetermined rate (for example, to 95% of the upper limit value) (C04). This is because, if the coupling between the MPLS nodes is allocated to the Ethernet path, a margin for the bandwidth needs to be secured considering the burstiness of data to be communicated through the path. For example, if the NNI available upper limit value T16 is reduced to 95% as described above, it does not mean that the upper limit value is actually reduced, but means that the remaining 5% of the bandwidth is secured as a margin (in other words, so as not to be allocated to another path).

For example, referring to the path table T20 of FIG. 7, the link between the MPLS node 100#1 and the MPLS node 100#2 is allocated to "Path 2" and "Path 3", but the types of those paths are respectively "VC-3" and "VC-4" and are not the Ethernet path. Therefore, the NNI available upper limit values T16 corresponding to the above-mentioned link (in other words, the upper limit value "2400" corresponding to the node name "A" and the passing route "Side04" and the upper limit value "2400" corresponding to the node name "B" and the passing route "Side02") are not reduced.

Meanwhile, the link between the MPLS node 100#3 and the MPLS node 100#4 is allocated to "Path 1", and the type of the path is the Ethernet path. Therefore, the NNI available upper limit values T16 corresponding to the above-mentioned link (in other words, the upper limit value "9900" corresponding to the node name "C" and the passing route "Side02" and the upper limit value "9900" corresponding to the node name "D" and the passing route "Side04") are reduced to 95%.

It should be noted that, if the remaining bandwidth itself is registered in place of the NNI used bandwidth T15 and the NNI available upper limit value T16, in Step C04, the topology calculation module 49 reduces the remaining bandwidth.

Further, the example in which the NNI available upper limit value T16 is reduced by the predetermined rate is described above, but the NNI available upper limit value T16 may be reduced by a predetermined amount (for example, predetermined bandwidth).

Next, the topology calculation module 49 of the management computer 1 judges whether or not the coupling between the MPLS nodes is usable based on the path bandwidth after conversion, the NNI used bandwidth, and the available upper limit value (C05).

Here, the fact that the coupling between the MPLS nodes is usable means that, even if the coupling between the MPLS nodes is allocated to the path to be opened, the bandwidth for the coupling between the MPLS nodes does not become insufficient, in other words, the coupling between the MPLS nodes has a remaining bandwidth that can be allocated to the path. If the route only including the coupling between the MPLS nodes that is usable is allocated to the path, the bottleneck does not occur in the path route. The topology calculation module 49 subtracts the value of the NNI used bandwidth T15 from the value of the NNI available upper limit value T16 corresponding to each coupling between the MPLS nodes, to thereby calculate the remaining bandwidth of the each coupling between the MPLS nodes. If the remaining bandwidth is the path bandwidth after conversion or more, it is judged that the coupling between the MPLS nodes is usable, and if the remaining bandwidth is less than the path bandwidth after conversion, it is judged that the coupling between the MPLS nodes is unusable.

It should be noted that, in order to accurately judge whether or not the coupling between the MPLS nodes is usable, the following processing needs to be executed. That is, the link type of each coupling between the MPLS nodes is specified based on the device table T10, the bandwidth corresponding to the link type is specified based on the header conversion rate table T30, and the specified bandwidth is compared to the remaining bandwidth of the each coupling between the MPLS nodes. However, in the above-mentioned processing, the bandwidth to be compared to the remaining bandwidth is uniformly determined regardless of the link type of each coupling between the MPLS nodes, which is illustrated in Steps B02 and C02. By performing calculation using the uniform bandwidth, the effect of this invention, specifically, the reduction in the amount of calculation is obtained. On the other hand, however, the coupling between the MPLS nodes judged to be usable in Step C05 may actually be unusable in some cases, and conversely, the coupling between the MPLS nodes judged to be unusable may actually be usable in other cases.

In view of the above, in order to judge whether or not the coupling between the MPLS nodes judged to be usable in Step C05 is actually usable, the continuity check processing E00 to be described later is executed. Meanwhile, the coupling between the MPLS nodes judged to be unusable in Step C05 is judged to be usable in some cases when the next path route search processing is executed, which is illustrated in Step B07.

The topology calculation module 49 of the management computer 1 repeats the processing until the processing of C03 is finished, to thereby create NNI topology information to be used for the search in the path route search processing B00 (C06).

With this processing, the management computer 1 terminates the topology calculation processing C00 (C07).

Figure 13:
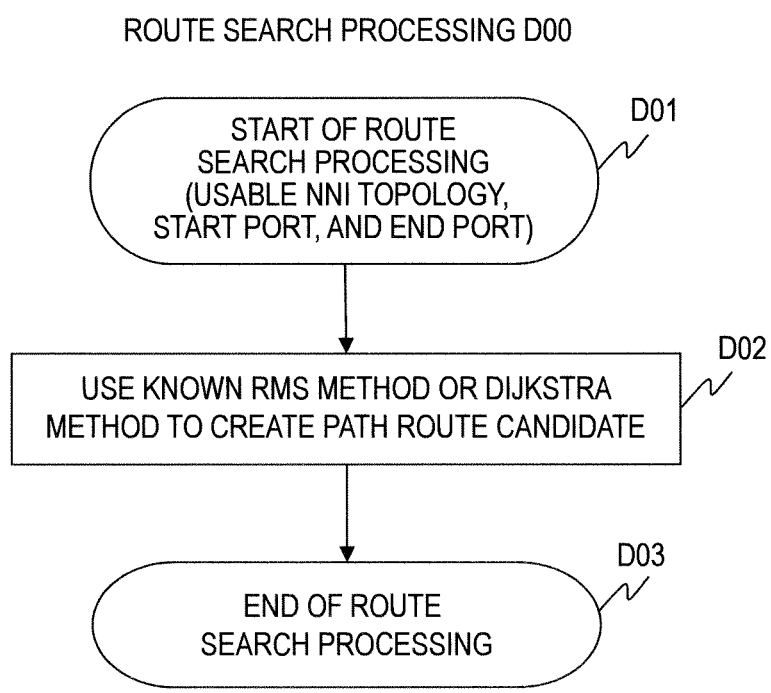
FIG. 13 is a flowchart illustrating a route search processing executed by the management computer according to the embodiment of this invention.

FIG. 13 is a flowchart illustrating the route search processing D00 executed by the management computer 1 according to the embodiment of this invention.

The route search processing module 50 of the management computer 1 receives, as inputs, the usable NNI topology created by the topology calculation processing C00, the start port, and the end port to start the route search processing (D01).

The route search processing module 50 of the management computer 1 uses a general route search algorithm (multi-route selection method, Dijkstra method, or the like) to determine the path route candidate (D02).

Specifically, for example, in a case where there exists a route from the start port to the end port only via the link judged to be usable by the topology calculation processing C00 (in other words, a route from the start port to the end port bypassing the link judged to be unusable), the route is determined as the path route candidate. In a case where there exist a plurality of such routes, all or part of the plurality of such routes may be determined as the path route candidate. For example, in a case where there exist a large number of such routes, a predetermined number of routes are determined as the path route candidates in ascending order of the total amount of cost (for example, hop count) from among those routes. On the other hand, there exists no such route, it is judged in Step B05 of FIG. 11 that the path route candidate does not exist.

With this processing, the management computer 1 terminates the route search processing D00 (D03).

FIG. 14 is a flowchart illustrating the continuity check processing E00 executed by the management computer 1 according to the embodiment of this invention.

The continuity check processing module 51 of the management computer 1 receives, as inputs, the path bandwidth, the path route candidate, the device table T10, and the header conversion rate table T30, to start the continuity check processing (E01).

First, the continuity check processing module 51 of the management computer 1 repeats the processing of Steps E03 to E06 on the path route candidate in ascending order of, for example, the number of hop counts on the path route (in other words, the number of the MPLS nodes through which the path route passes) (E02).

The continuity check processing module 51 of the management computer repeats the processing of Steps E04 and E05 by the number of the couplings between the MPLS nodes included in the path route candidate (E03).

The continuity check processing module 51 of the management computer 1 uses the device table T10, the header conversion rate table T30, and the path bandwidth to judge whether or not the NNIs coupling the MPLS nodes 100 to each other (in other words, the NNIs provided on the both ends of the link coupling those MPLS nodes 100 to each other) are actually usable (E04).

As described above referring to FIG. 12, the coupling between the MPLS nodes to be subjected to the judgment in Step E04 has already been judged to be usable by the topology calculation processing C00. However, that judgment is performed without considering an actual type of each coupling between the MPLS nodes. In Step E04, based on the actual type, it is judged whether or not the coupling between the MPLS nodes to be subjected to the judgment is actually usable. In the following description, the state in which it is judged that the coupling between the MPLS nodes is actually usable based on the actual type is referred to as "continuity possible".

Specifically, the continuity check processing module 51 refers to the header conversion rate table T30 to acquire the bandwidth corresponding to the combination of an actual type of NNIs in the coupling between the MPLS nodes to be subjected to the judgment and the type of the path to be opened. The bandwidth acquired in such a manner is a bandwidth to be actually allocated to the path in the coupling between the MPLS nodes to be subjected to the judgment. Then, the continuity check processing module 51 refers to the device table T10 to judge whether or not the bandwidth to be allocated to the path remains in the coupling between the MPLS nodes. If the bandwidth to be allocated to the path remains, it is judged that the coupling between the MPLS nodes is "continuity possible".

The continuity check processing module 51 of the management computer 1 repeats the processing of Step E03 until the processing of Step E03 is finished for all couplings between the MPLS nodes included in the path route candidate (E05). If it is judged that the NNIs are usable in all couplings between the MPLS nodes included in one path route candidate (in other words, the path route candidate does not pass through the NNI that is not "continuity possible"), the path route candidate is "continuity possible".

If it is judged that any of the path route candidates is "continuity possible", or if the path route candidate judged to be "continuity possible" cannot be found even when the processing of Step E02 is repeatedly executed until the processing of Step E02 is finished for all path route candidates, the continuity check processing module 51 of the management computer 1 terminates the processing of Step E02 (E06).

With this processing, the management computer 1 terminates the continuity check processing E00 (E07).

If it is judged as a result of the continuity check processing E00 that any of the path route candidates is "continuity possible", it is judged in Step B08 of the path route search processing B00 (FIG. 11) that there exists a path route candidate that is "continuity possible", and if the path route candidate that is "continuity possible" cannot be found, it is judged that there is no path route candidate that is "continuity possible".

Figure 15:
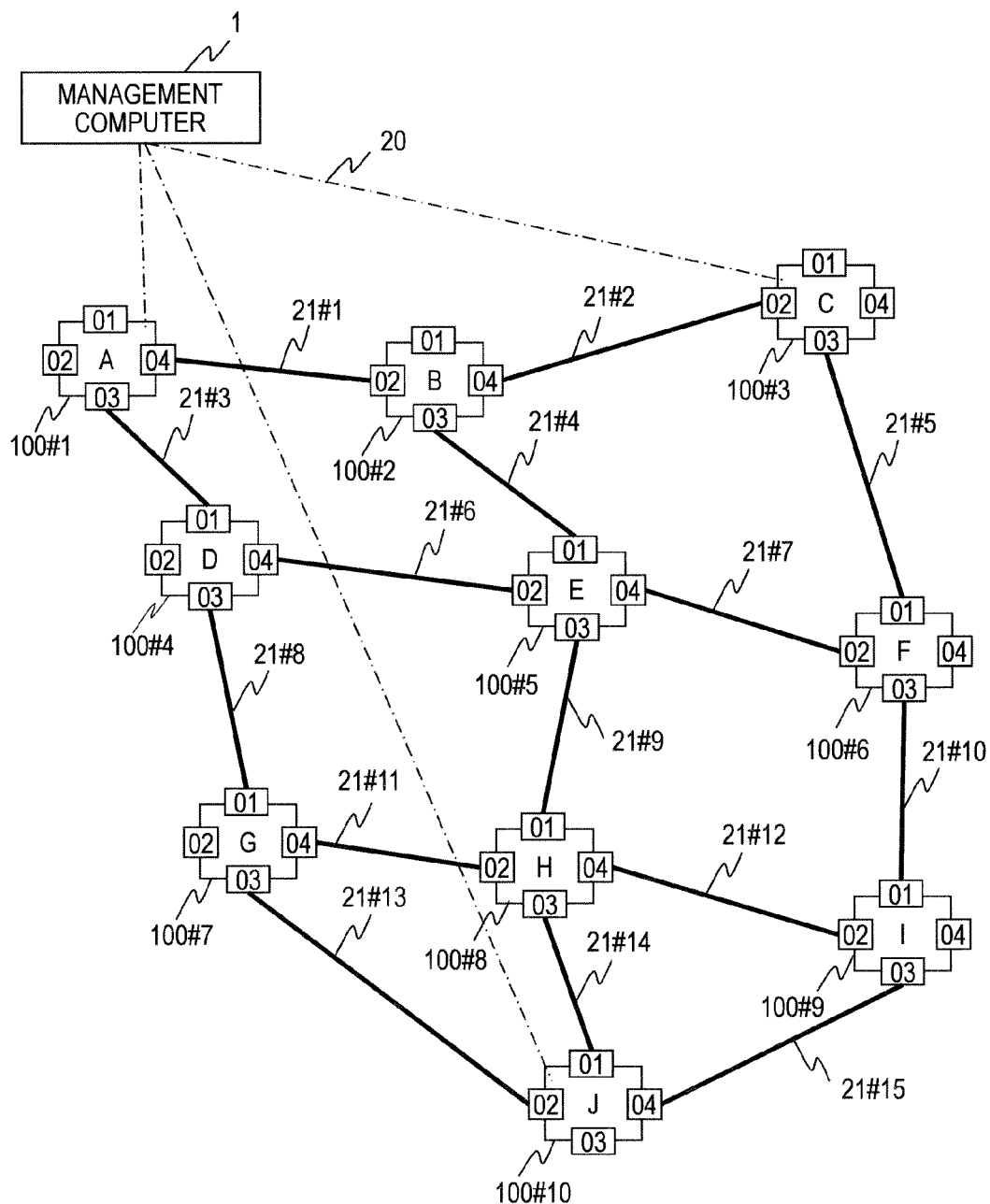
FIG. 15 is an explanatory diagram illustrating a network configuration example to which the embodiment of this invention is applied.
Figure 16:
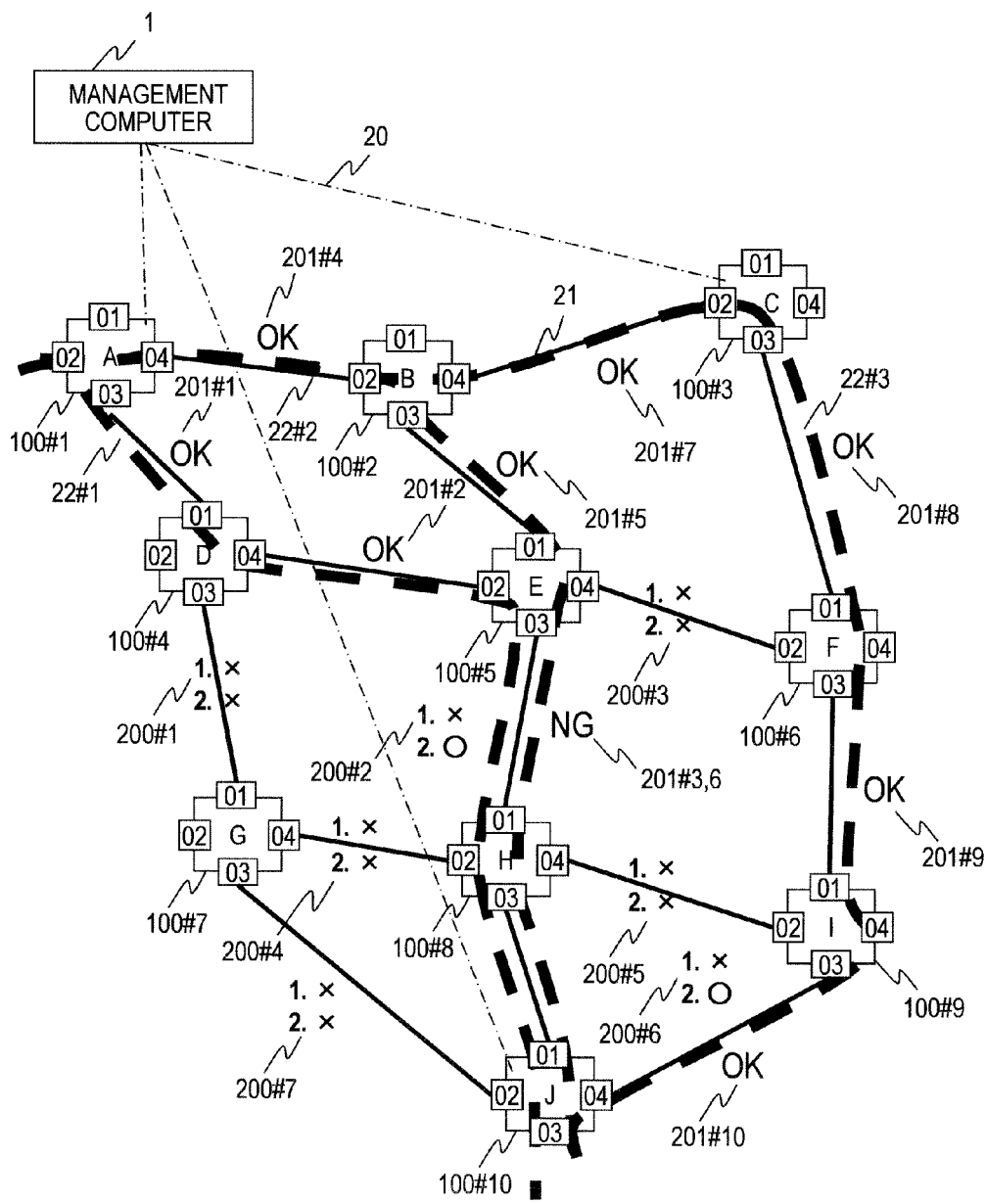
FIG. 16 is an explanatory diagram illustrating a specific example of the path route search processing, the topology calculation processing, the route search processing, and the continuity check processing which are executed by the management computer according to the embodiment of this invention.

Referring to FIGS. 15 and 16, description is given of a specific example of the embodiment of this invention.

FIG. 15 is an explanatory diagram illustrating a network configuration example to which the embodiment of this invention is applied.

Specifically, FIG. 15 is an example in which the devices illustrated in FIGS. 1 to 3 are used to constitute the network including ten MPLS nodes 100 (specifically, MPLS nodes 100#1 to 100#10) and fifteen couplings 21 between the MPLS nodes (specifically, couplings 21#1 to 21#15 between the MPLS nodes). Based on this configuration, tables similar to those illustrated in FIGS. 5 to 8 are created and managed by the management computer 1.

In the following, description is given by taking as an example a case where, after the path name, the path type, the path bandwidth, the start port, and the end port are input through the path opening screen G00 illustrated in FIG. 9, an external interface corresponding to the passing route Side02 of the MPLS node A (100#1) illustrated in FIG. 15 is specified as the start port and an external interface corresponding to the passing route Side03 of the MPLS node J (100#10) illustrated in FIG. 15 is specified as the end port.

FIG. 16 is an explanatory diagram illustrating a specific example of the path route search processing B00, the topology calculation processing C00, the route search processing D00, and the continuity check processing E00 which are executed by the management computer 1 according to the embodiment of this invention.

FIG. 16 illustrates an example of path openings in the network illustrated in FIG. 15. In other words, the topology of the network illustrated in FIG. 16 is the same as that illustrated in FIG. 15, but reference symbols of the respective couplings 21#1 to 21#15 between the MPLS nodes are not illustrated.

The topology calculation module 49 of the management computer 1 uses the header conversion rate determined in Step B02 to execute the topology calculation processing C00. It is assumed that topology calculation results 200#1 to 200#7 are acquired by the processing. The sign "○" illustrated in FIG. 16 indicates the topology calculation result judged to be usable, the sign "x" illustrated in FIG. 16 indicates the topology calculation result judged to be unusable. The topology calculation results 200#1 to 200#7 acquired at this time point respectively indicate that the couplings 21#8, 21#9, 21#7, 21#11, 21#12, 21#15, and 21#13 between the MPLS nodes are unusable.

The route search processing module 50 of the management computer 1 uses the above-mentioned NNI topology, and the start port and the end port which are input through the path opening screen G00 of FIG. 9 to execute the route search processing D00. If the topology calculation results 200#1 to 200#7 indicate that the corresponding couplings are unusable, the start port and the end port cannot be coupled to each other without being passing through the NNI that is unusable, and hence it is judged as a route search result that there is no path route candidate.

Therefore, the path route search calculation module 47 of the management computer 1 acquires again the header conversion rate in Step B02, and then executes the topology calculation processing C00 based on the acquired value. In Step B02 of this time, a bandwidth less than that acquired in Step B02 of the previous time, and hence the NNI judged to be unusable in the topology calculation processing C00 of the previous time may be judged to be usable in the topology calculation processing C00 of this time.

In the example of FIG. 16, it is assumed that, as a result of the second topology calculation, the topology calculation results 200#1, 200#3, 200#4, 200#5, and 200#7 indicate that the corresponding couplings are "unusable" and the topology calculation results 200#2 and 200#6 indicate that the corresponding couplings are "unusable". In other words, at this time point, the couplings 21#8, 21#7, 21#11, 21#12, and 21#13 between the MPLS nodes are still judged to be unusable, but the couplings 21#9 and 21#15 between the MPLS node are judged to be usable.

The route search processing module 50 of the management computer 1 uses the above-mentioned NNI topology, and the start port and the end port which are input through the path opening screen G00 of FIG. 9 to execute the route search processing D00. As a result of the route search, path route candidates 22#1, 22#2, and 22#3, which are indicated by the thick broken lines, are acquired. The path route candidate 22#1 passes through the couplings 21#3, 21#6, 21#9, and 21#14 between the MPLS nodes. The path route candidate 22#2 passes through the couplings 21#1, 21#4, 21#9, and 21#14 between the MPLS nodes. The path route candidate 22#3 passes through the couplings 21#1, 21#2, 21#5, 21#10, and 21#15 between the MPLS nodes. None of those path route candidates pass through the coupling between the MPLS node judged to be unusable.

The path route candidates are acquired as described above, and hence the path route search calculation module 47 of the management computer 1 uses those three path route candidates to execute the continuity check processing E00.

The continuity check processing module 51 of the management computer 1 starts the continuity check processing in descending order of priority of the path route candidate. Here, as an example of the priority, the priority is higher from the left side, in other words, in order of the path route candidates 22#1, 22#2, and 22#3. For example, the route having a smaller hop count may be given a higher priority.

The continuity check processing module 51 of the management computer 1 performs a continuity check from the start port in order of routes of the path route candidate. FIG. 16 illustrates continuity check results 201#1 to 201#10. The sign "OK" illustrated in FIG. 16 indicates the continuity check result judged to be "continuity possible", and the sign "NG" illustrated in FIG. 16 indicates the continuity check result judged to be "continuity not possible". The continuity check results 201#1 to 201#10 respectively indicate the continuity check results of the couplings 21#3, 21#6, 21#9, 21#1, 21#4, 21#9, 21#2, 21#5, 21#10, and 21#15 between the MPLS nodes.

In the case of the path route candidate 22#1, the continuity check result 201#3 is "NG". This means that the remaining bandwidth in the coupling 21#9 between the MPLS nodes becomes insufficient because the bandwidth required to be actually allocated to the link is larger than the bandwidth used for the calculation in the topology calculation processing C00. In other words, if the path route candidate 22#1 is allocated to the path, the bottleneck occurs on the coupling 21#9 between the MPLS nodes. In short, the path route candidate 22#1 is "continuity not possible".

In the case of the path route candidate 22#2, the continuity check result 201 #6 corresponding to the coupling 21 #9 between the MPLS nodes is "NG". Therefore, as in the above-mentioned case of the path route candidate 22#1, the path route candidate 22#2 is also "continuity not possible".

In the case of the path route candidate 22#3, all the links up to the end port are judged to be "continuity possible". This means that the bottleneck does not occur on the path route candidate 22#3. In this case, the path route candidate 22#3 is acquired as a route that is "continuity possible" (E06), and the continuity check processing is terminated (E07).

In the example of FIG. 16, through the topology calculation processing executed twice, the route search processing executed twice, and the continuity check processing executed once, the path route that can be opened is acquired, and the path route search processing B00 is terminated. In a case where the path route candidate cannot be acquired even in the second route search processing, the third and subsequent topology calculation processing and route search processing are executed using further eased conditions. The same applies to the case where the path route candidate that is "continuity possible" cannot be acquired through the first continuity check processing.

As described above, according to this embodiment, when the type of the path to be opened is specified, one or more routes that can be probably used as routes to be allocated to the path are first selected as the path route candidates, which is illustrated in FIGS. 11 to FIG. 13. Then, it is judged whether or not each of the path route candidates is actually usable, which is illustrated in FIG. 14.

In order to select the path route candidates, it is judged for each of a large number of (typically, all) NNIs existing in the packet transport network whether or not the each of NNIs is usable (C05). This judgment is executed by comparing the remaining bandwidth in each of the NNIs to the bandwidth to be allocated to the path to be opened. In this embodiment, for this judgment, a uniform bandwidth (in other words, bandwidth converted in the processing of C02) is acquired as the bandwidth to be allocated to the path to be opened regardless of the type of each of NNIs, and the uniform bandwidth is compared to the remaining bandwidth. Therefore, at this stage, there is no need to calculate the bandwidth to be allocated to the path for each of the NNIs.

After that, in order to judge whether or not each of the path route candidates is actually usable, it is judged whether or not the NNIs through which each of the path route candidates passes is "continuity possible" (E04). This judgment is also executed by comparing the remaining bandwidth in each of the NNIs to the bandwidth to be allocated to the path to be opened. It should be noted that, in this procedure, the value dependent on the type of each of the NNIs is acquired as the bandwidth to be allocated, which is illustrated in FIG. 8, and this value is compared to the remaining bandwidth.

As described above, according to this embodiment, the judgment based on the bandwidth dependent on the type of each of the NNIs is executed only on the NNIs narrowed down as candidates, and there is no need to execute that judgment on all NNIs in the packet transport network. With this, it is possible to reduce the amount of calculation.

In Step C05 of the first topology calculation processing C00, as the bandwidth to be allocated to the path, of all bandwidths corresponding to all the combinations of the types of the path to be opened and the types of all NNIs existing in the packet transport network, the largest bandwidth is acquired (B02 and C02), and the bandwidth is compared to the remaining bandwidth of each of the NNIs. This means that, in a case where the path route candidate is acquired based on the NNIs judged to be usable in the first topology calculation processing C00 (B04 and D00), this path route candidate is always judged to be "continuity possible" (B06 and E00). Therefore, in a case where the path route candidate is acquired based on the NNIs judged to be usable in the first topology calculation processing C00, the execution of the continuity check processing E00 may be omitted.

In a case where the path route candidate cannot be acquired based on the NNIs judged to be usable in the first topology calculation processing C00, as the bandwidth to be allocated to the path, of all bandwidths corresponding to all the above-mentioned combinations, the second largest bandwidth (in other words, the largest bandwidth of the bandwidths that have not been selected yet) is acquired (B02 and C02), and this bandwidth is compared to the remaining bandwidth of each of the NNIs (C05). This means that the condition required for the remaining bandwidth of each of the NNIs is eased compared to the first processing. Therefore, the NNI judged to be unusable in the first processing is judged to be usable in the second processing in some cases. It should be noted that the NNI judged to be usable in the processing may be judged to be not "continuity possible" in the continuity check processing E00 in some cases.

In this embodiment, as described above, the largest bandwidth is used in Step C05 of the first topology calculation processing C00, and after that, every time the topology calculation processing C00 is repeated, the value of the bandwidth used for the processing decreases. As the condition required for the remaining bandwidth of each of the NNIs is eased more, the NNI is more likely to be judged to be usable in Step C05, but the NNI judged to be usable in Step C05 is more likely to be judged to be not "continuity possible" in Step E04.

Such relationship of the number of times of repeating the topology calculation processing C00 and the value of bandwidths used for the processing as described above is an example, and the bandwidth may be used in other order than that described above. For example, the smallest bandwidth may be used in Step C05 of the first topology calculation processing C00. In any case, the judgment based on the bandwidth dependent on the type of each NNI is executed only on the NNI narrowed down as the candidates, and hence it is possible to obtain the effect of this invention of reducing the amount of calculation.

In the case where the remaining bandwidth is compared to the bandwidth in descending order of bandwidth as in this embodiment, it is expected that as the packet transport network is less busy (for example, the number of paths that have already been opened becomes smaller), the number of times of repeating the topology calculation processing C00 required for finding the path route that is "continuity possible" becomes smaller.

As long as the device topology table T00, the device table T10, the path table T20, and the header conversion rate table T30 respectively include information for constituting the network topology by the nodes, information associating the communication interface with the passing route and information on the used bandwidths, information for controlling the paths, and information on header conversion rate dependent on the device such as link type and path type, even if the table configurations are different from those of FIGS. 5 to 8, it is possible to realize this invention.

Even if the screen configuration of the path opening screen example G00 is different from that of FIG. 9, as long as the screen configuration includes means for inputting information necessary for opening the path, it is possible to realize this invention.

Even if the order of processing of the path opening processing A00 is different, as long as the processing is executed in the flow in which the path route is determined through the path route search processing, and by using the result, the settings of the path route information on the node and the reflection of the information to the management computer 1 are executed, it is possible to realize this invention.

This invention is not limited to the MPLS/MPLS-TP method, and is applicable to a network in which a plurality of the interface types and a plurality of types of paths are accommodated in a mixed manner and the header conversion rate is different for each interface type and each path type.

According to the embodiment described above, the bandwidth management and the path route search in the packet transport network that take into consideration the link type between the MPLS nodes and the path type to be accommodated are realized. With this, it is possible to determine the path route in which the bottleneck does not occur by a small amount of calculation.

What is claimed is:
1. A network system, comprising:
 a plurality of data transfer devices which are coupled to each other and each transfer data; and
 a management computer coupled to at least one of the plurality of data transfer devices, each of the plurality of data transfer devices comprising a plurality of communication interfaces, each of which is coupled to another one of the plurality of data transfer devices, and a switch coupled to the plurality of communication interfaces, for switching a transfer direction of the data transferred between the plurality of data transfer devices, the management computer comprising an interface coupled to the at least one of the plurality of data transfer devices, a processor coupled to the interface, and a storage device coupled to the processor, wherein the management computer is configured to:
store interface type information indicating a type of each of the plurality of communication interfaces, conversion information associating a type of a path to be opened in the network system, a used amount of bandwidth of the path, and a bandwidth to be allocated to the path in each type of the plurality of communication interfaces with one another, and remaining bandwidth information indicating, of the bandwidths which can be allocated to the path in the each of the plurality of communication interfaces, a remaining bandwidth which has not yet been allocated to any of the paths;

select one of a plurality of the bandwidths included in the conversion information when an instruction to open a new path including a designated start point and a designated end point is given;

compare the remaining bandwidth in the each of the plurality of communication interfaces included in the remaining bandwidth information to the selected one of the plurality of the bandwidths to judge whether or not the each of the plurality of communication interfaces is usable;

determine a data transfer route candidate though which the data is transferred from the designated start point to the designated end point, bypassing the each of the plurality of communication interfaces which has been judged to be unusable;

determine, based on the interface type information, the type of each of the plurality of communication interfaces through which the determined data transfer route candidate passes;

determine, based on the conversion information, the bandwidth to be allocated to the new path in the determined type of the each of the plurality of communication interfaces;

compare the remaining bandwidth of the each of the plurality of communication interfaces through which the determined data transfer route candidate passes, which is included in the remaining bandwidth information, to the determined bandwidth to be allocated to the new path in the determined type of the each of the plurality of communication interfaces, to judge whether or not continuity of the each of the plurality of communication interfaces is possible; and transmit, when the determined data transfer route candidate does not pass through the each of the plurality of communication interfaces, the continuity of which has been judged to be not possible, information for giving an instruction to allocate the determined data transfer route candidate to the new path, to the at least one of the plurality of data transfer devices coupled to the management computer.

2. The network system according to claim 1, wherein:
the instruction to open the new path further includes information for designating the type and the used amount of bandwidth of the new path; and
the management computer is further configured to:
determine, based on the conversion information, the plurality of the bandwidths to be allocated to the new path in a plurality of types of the plurality of communication interfaces, and select one of the plurality of the determined bandwidths;
judge, based on the remaining bandwidth information, when the remaining bandwidth in the each of the plurality of communication interfaces is less than the selected one of the plurality of the determined bandwidths, that the each of the plurality of communication interfaces is unusable; and
judge, based on the remaining bandwidth information, when the remaining bandwidth of the each of the plurality of communication interfaces through which the determined data transfer route candidate passes is less than the determined bandwidth to be allocated to the new path in the determined type of the each of the plurality of communication interfaces, that the continuity of the each of the plurality of communication interfaces is not possible.

3. The network system according to claim 2, wherein the management computer selects, when the management computer cannot determine the data transfer route candidate though which the data is transferred from the designated start point to the designated end point, bypassing the each of the plurality of communication interfaces which has been judged to be unusable, of the plurality of the determined bandwidths, a bandwidth which has not been selected yet.

4. The network system according to claim 3, wherein the management computer selects, of a plurality of the bandwidths which have not been selected yet of the plurality of the determined bandwidths, a largest bandwidth.

5. The network system according to claim 1, wherein the management computer uses, when the each of the plurality of communication interfaces is allocated to a predetermined type of the path, a value obtained by reducing the remaining bandwidth corresponding to the each of the plurality of communication interfaces by one of a predetermined amount and a predetermined rate to compare the value to the determined bandwidth.

6. The network system according to claim 5, wherein the predetermined type of the path comprises an Ethernet path.

7. A management computer coupled to a network system, the network system comprising a plurality of data transfer devices which are coupled to each other and each transfer data,
each of the plurality of data transfer device comprising a plurality of communication interfaces, each of which is coupled to another one of the plurality of data transfer devices, and a switch coupled to the plurality of communication interfaces, for switching a transfer direction of the data transferred between the plurality of data transfer devices,
the management computer comprising:
an interface coupled to the at least one of the plurality of data transfer devices;
a processor coupled to the interface; and
a storage device coupled to the processor, wherein:
the storage device stores interface type information indicating a type of each of the plurality of communication interfaces, conversion information associating a type of a path to be opened in the network system, a used amount of bandwidth of the path, and a bandwidth to be allocated to the path in each type of the plurality of communication interfaces with one another, and remaining bandwidth information indicating, of the bandwidths which can be allocated to the path in the each of the plurality of communication interfaces, a remaining bandwidth which has not yet been allocated to any of the paths;

the processor is configured to:

select one of a plurality of the bandwidths included in the conversion information when an instruction to open a new path including a designated start point and a designated end point is given;

compare the remaining bandwidth in the each of the plurality of communication interfaces included in the remaining bandwidth information to the selected one of the plurality of the bandwidths to judge whether or not the each of the plurality of communication interfaces is usable;

determine a data transfer route candidate though which the data is transferred from the designated start point to the designated end point, bypassing the each of the plurality of communication interfaces which has been judged to be unusable;

determine, based on the interface type information, the type of each of the plurality of communication interfaces through which the determined data transfer route candidate passes;

determine, based on the conversion information, the bandwidth to be allocated to the new path in the determined type of the each of the plurality of communication interfaces;

compare the remaining bandwidth of the each of the plurality of communication interfaces through which the determined data transfer route candidate passes, which is included in the remaining bandwidth information, to the determined bandwidth to be allocated to the new path in the determined type of the each of the plurality of communication interfaces, to judge whether or not continuity of the each of the plurality of communication interfaces is possible; and transmit, when the determined data transfer route candidate does not pass through the each of the plurality of communication interfaces, the continuity of which has been judged to be not possible, information for giving an instruction to allocate the determined data transfer route candidate to the new path, to the at least one of the plurality of data transfer devices coupled to the management computer.

8. The management computer according to claim 7, wherein:

the instruction to open the new path further includes information for designating the type and the used amount of bandwidth of the new path; and the processor is further configured to:

determine, based on the conversion information, the plurality of the bandwidths to be allocated to the new path in a plurality of types of the plurality of communication interfaces, and select one of the plurality of the determined bandwidths;

judge, based on the remaining bandwidth information, when the remaining bandwidth in the each of the plurality of communication interfaces is less than the selected one of the plurality of the determined bandwidths, that the each of the plurality of communication interfaces is unusable; and judge, based on the remaining bandwidth information, when the remaining bandwidth of the each of the plurality of communication interfaces through which the determined data transfer route candidate passes is less than the determined bandwidth to be allocated to the new path in the determined type of the each of the plurality of communication interfaces, that the continuity of the each of the plurality of communication interfaces is not possible.

9. The management computer according to claim 8, wherein the processor selects, when the management computer cannot determine the data transfer route candidate though which the data is transferred from the designated start point to the designated end point, bypassing the each of the plurality of communication interfaces which has been judged to be unusable, of the plurality of the determined bandwidths, a bandwidth which has not been selected yet.

10. The management computer according to claim 9, wherein the processor selects, of a plurality of the bandwidths which have not been selected yet of the plurality of the determined bandwidths, a largest bandwidth.

11. The management computer according to claim 7, wherein the processor uses, when the each of the plurality of communication interfaces is allocated to a predetermined type of the path, a value obtained by reducing the remaining bandwidth corresponding to the each of the plurality of communication interfaces by one of a predetermined amount and a predetermined rate to compare the value to the determined bandwidth.

12. The management computer according to claim 11, wherein the predetermined type of the path comprises an Ethernet path.

13. A bandwidth management method to be executed in a network system, the network system comprising a plurality of data transfer devices which are coupled to each other and each transfer data, and a management computer coupled to at least one of the plurality of data transfer devices, each of the plurality of data transfer device comprising a plurality of communication interfaces, each of which is coupled to another one of the plurality of data transfer devices, and a switch coupled to the plurality of communication interfaces, for switching a transfer direction of the data transferred between the plurality of data transfer devices, the management computer comprising an interface coupled to the at least one of the plurality of data transfer devices, a processor coupled to the interface, and a storage device coupled to the processor, the management computer storing interface type information indicating a type of each of the plurality of communication interfaces, conversion information associating a type of a path to be opened in the network system, a used amount of bandwidth of the path, and a bandwidth to be allocated to the path in each type of the plurality of communication interfaces with one another, and remaining bandwidth information indicating, of the bandwidths which can be allocated to the path in the each of the plurality of communication interfaces, a remaining bandwidth which has not yet been allocated to any of the paths, the bandwidth management method comprising:

a first step of selecting, by the management computer, one of a plurality of the bandwidths included in the conversion information when an instruction to open a new path including a designated start point and a designated end point is given;

a second step of comparing, by the management computer, the remaining bandwidth in the each of the plurality of communication interfaces included in the remaining bandwidth information to the selected one of the plurality of the bandwidths to judge whether or not the each of the plurality of communication interfaces is usable;

a third step of determining, by the management computer, a data transfer route candidate though which the data is transferred from the designated start point to the designated end point, bypassing the each of the plurality of communication interfaces which has been judged to be unusable;

a fourth step of determining, by the management computer, based on the interface type information, the type of each of the plurality of communication interfaces through which the determined data transfer route candidate passes, determining, based on the conversion information, the bandwidth to be allocated to the new path in the determined type of the each of the plurality of communication interfaces, and comparing the remaining bandwidth of the each of the plurality of communication interfaces through which the determined data transfer route candidate passes, which is included in the remaining bandwidth information, to the determined bandwidth to be allocated to the new path in the determined type of the each of the plurality of communication interfaces, to judge whether or not continuity of the each of the plurality of communication interfaces is possible; and a fifth step of transmitting, by the management computer, when the determined data transfer route candidate does not pass through the each of the plurality of communication interfaces, the continuity of which has been judged to be not possible, information for giving an instruction to allocate the determined data transfer route candidate to the new path, to the at least one of the plurality of data transfer devices coupled to the management computer.

14. The bandwidth management method according to claim 13, wherein:

the instruction to open the new path further includes information for designating the type and the used amount of bandwidth of the new path;

the first step comprises determining, by the management computer, based on the conversion information, the plurality of the bandwidths to be allocated to the new path in a plurality of types of the plurality of communication interfaces, and selecting one of the plurality of the determined bandwidths;

the second step comprises judging, by the management computer, based on the remaining bandwidth information, when the remaining bandwidth in the each of the plurality of communication interface is less than the selected one of the plurality of the determined bandwidths, that the each of the plurality of communication interfaces is unusable; and the fourth step comprises judging, by the management computer, based on the remaining bandwidth information, when the remaining bandwidth of the each of the plurality of communication interfaces through which the determined data transfer route candidate passes is less than the determined bandwidth to be allocated to the new path in the determined type of the each of the plurality of communication interfaces, that the continuity of the each of the plurality of communication interfaces is not possible.

15. The bandwidth management method according to claim 14, wherein:

in the third step, when the data transfer route candidate though which the data is transferred from the designated start point to the designated end point, bypassing the each of the plurality of communication interfaces which has been judged to be unusable, cannot be determined, the fourth step is executed again; and in the fourth step, the management computer selects, of the plurality of the determined bandwidths, a bandwidth which has not been selected yet.

16. The bandwidth management method according to claim 15, wherein, in the fourth step, the management computer selects, of a plurality of the bandwidths which have not been selected yet of the plurality of the determined bandwidths, a largest bandwidth.

17. The bandwidth management method according to claim 13, wherein, in the second step and the fourth step, the management computer uses, when the each of the plurality of communication interfaces is allocated to a predetermined type of the path, a value obtained by reducing the remaining bandwidth corresponding to the each of the plurality of communication interfaces by one of a predetermined amount and a predetermined rate to compare the value to the determined bandwidth.

18. The bandwidth management method according to claim 17, wherein the predetermined type of the path comprises an Ethernet path.

* * * * *